US009327406B1

(12) United States Patent
Hinterstoisser et al.

(10) Patent No.: US 9,327,406 B1
(45) Date of Patent: May 3, 2016

(54) OBJECT SEGMENTATION BASED ON DETECTED OBJECT-SPECIFIC VISUAL CUES

(71) Applicant: Google Inc., Mountain View, CA (US)

(72) Inventors: Stefan Hinterstoisser, Munich (DE); Kurt Konolige, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/463,156

(22) Filed: Aug. 19, 2014

(51) Int. Cl.
*G06T 15/00* (2011.01)
*B25J 9/16* (2006.01)

(52) U.S. Cl.
CPC .................................... *B25J 9/1697* (2013.01)

(58) Field of Classification Search
CPC ... G06K 9/32; G06K 9/6211; H04N 13/0239; H04N 2013/0081; G06T 17/00; G06T 7/2006; B25J 9/16
USPC .......... 700/253, 259; 382/154, 103, 276, 285; 345/419, 676, 619
See application file for complete search history.

(56) References Cited

U.S. PATENT DOCUMENTS

| 4,831,549 | A | 5/1989 | Red et al. |
|---|---|---|---|
| 5,541,485 | A | 7/1996 | Teichmann et al. |
| 5,992,751 | A | 11/1999 | Laser |
| 6,493,607 | B1 | 12/2002 | Bourne et al. |
| 6,614,928 | B1 | 9/2003 | Chung et al. |
| 6,944,324 | B2 * | 9/2005 | Tran ...................... G06T 7/0004 382/101 |
| 7,099,745 | B2 | 8/2006 | Ebert |
| 7,587,082 | B1 | 9/2009 | Rudin et al. |
| 7,693,757 | B2 * | 4/2010 | Zimmerman .......... G06Q 10/00 235/462.11 |
| 7,809,158 | B2 | 10/2010 | Carpenter et al. |
| 7,818,091 | B2 | 10/2010 | Kazi et al. |
| 7,957,583 | B2 | 6/2011 | Boca et al. |

(Continued)

FOREIGN PATENT DOCUMENTS

| DE | 10324755 | 9/2004 |
|---|---|---|
| EP | 2156927 | 2/2010 |

(Continued)

OTHER PUBLICATIONS

Agarwal, Sameer, Mierle, Keir, and others: Ceres Solver. http://code.google.com/p/ceres-solver, last accessed Apr. 22, 2014, 2 pages.

(Continued)

*Primary Examiner* — Dalena Tran
(74) *Attorney, Agent, or Firm* — McDonnell Boehnen Hulbert & Berghoff LLP

(57) ABSTRACT

One or more images of a physical environment may be received, where the one or more images may include one or more objects. A type of surface feature predicted to be contained on a portion of one or more surfaces of a single object may be determined. Surface features of the type within regions of the one or more images may then be identified. The regions may then be associated to corresponding objects in the physical environment based on the identified surface features. Based at least in part on the regions associated to the corresponding objects, a virtual representation of the physical environment may be determined, the representation including at least one distinct object segmented from a remaining portion of the physical environment so as to virtually distinguish a boundary of the at least one distinct object from boundaries of objects present in the remaining portion of the physical environment.

20 Claims, 11 Drawing Sheets

(56) References Cited

U.S. PATENT DOCUMENTS

| | | | |
|---|---|---|---|
| 7,967,543 | B2 | 6/2011 | Criswell et al. |
| 8,108,072 | B2 | 1/2012 | Zhao et al. |
| 8,229,595 | B2 | 7/2012 | Seelinger et al. |
| 8,286,877 | B2 | 10/2012 | Olmstead |
| 8,306,314 | B2 | 11/2012 | Tuzel et al. |
| 8,306,663 | B2 | 11/2012 | Wickham |
| 8,360,318 | B2 | 1/2013 | Reynolds et al. |
| 8,379,014 | B2 | 2/2013 | Wiedemann et al. |
| 8,411,929 | B2 | 4/2013 | Silver |
| 8,447,863 | B1 * | 5/2013 | Francis, Jr. ........ G06F 17/30542 707/724 |
| 8,538,579 | B2 * | 9/2013 | Cottone ................ B25J 9/1697 414/730 |
| 8,600,161 | B2 | 12/2013 | Simon et al. |
| 2002/0150450 | A1 | 10/2002 | Bevirt et al. |
| 2008/0279446 | A1 | 11/2008 | Hassebrook et al. |
| 2008/0300723 | A1 | 12/2008 | Ban et al. |
| 2009/0118864 | A1 | 5/2009 | Eldridge et al. |
| 2010/0092267 | A1 | 4/2010 | Najdovski et al. |
| 2010/0286827 | A1 | 11/2010 | Franzius et al. |
| 2011/0320039 | A1 | 12/2011 | Hsu et al. |
| 2012/0095322 | A1 | 4/2012 | Tsekos et al. |
| 2012/0239194 | A1 | 9/2012 | Kagawa |
| 2012/0253507 | A1 | 10/2012 | Eldershaw et al. |
| 2012/0294510 | A1 | 11/2012 | Zhang et al. |
| 2013/0010081 | A1 | 1/2013 | Tenney et al. |
| 2013/0041508 | A1 | 2/2013 | Hu et al. |
| 2013/0147944 | A1 | 6/2013 | Zhang et al. |
| 2013/0151007 | A1 | 6/2013 | Valpola et al. |
| 2013/0335535 | A1 | 12/2013 | Kane et al. |
| 2013/0345870 | A1 | 12/2013 | Buehler et al. |
| 2014/0012415 | A1 | 1/2014 | Benaim et al. |
| 2014/0019392 | A1 | 1/2014 | Buibas |
| 2014/0088748 | A1 | 3/2014 | Woodtli et al. |

FOREIGN PATENT DOCUMENTS

| | | |
|---|---|---|
| WO | 2007/050776 | 5/2007 |
| WO | 2013/065003 | 5/2013 |

OTHER PUBLICATIONS

Curless, Brian et al., "A Volumetric Method for Building Complex Models from Range Images," Proceedings of the 23rd annual conference on Computer Graphics and Interactive Techniques, ACM, New York, New York, Aug. 4-9, 1996, pp. 303-312.

Davis, James et al., "Spacetime Stereo: A Unifying Framework for Depth from Triangulation," IEEE Transactions on Pattern Analysis and Machine Intelligence, Feb. 2005, pp. 296-302, vol. 27, No. 2.

Greene, D. H., "The decomposition of polygons into convex parts," in Computational Geometry, ser. Adv. Comput. Res., F. P. Preparata, Ed. Greenwich, CT: JAI Press, 1983, pp. 235-259, vol. 1.

Hoppe, H. et al., Surface Reconstuction from Unorganized Points, Computer Graphics (SIGGRAPH'92 proceedings), Jul. 1992, pp. 71-78, vol. 26, No. 2.

Jimenez, P. et al., "3D Collision Detection: a Survey," Computers & Graphics, 2001, pp. 269-285, vol. 25, No. 2.

John, J. Craig. "Introduction to robotics: mechanics and control," Addison-Wesley Publishing Company, Inc., Reading, MA, 1989, Chapters 3, 4 and 7, pp. 68-151 and 227-261.

Konolige, Kurt, "Projected Texture Stereo," Proceedings of the 2010 IEEE International Conference on Robotics and Automation (ICRA), May 3-7, 2010, p. 148-155.

Kuffner, J. "RRT-connect: An Efficient Approach to Single-Query Path Planning", IEEE International Conference on Robotics and Automation, 2000, pp. 1-7.

Lorensen et al., "Marching Cubes: A High Resolution 3D Surface Construction Algorithm," Computer Graphics, Jul. 1987, p. 163-169, vol. 21, No. 4.

Mans, Jack, Automated robotic truck loader optimizes shipping space, Smart Packaging, Jan. 1, 2012, http://www.packagingdigest.com/smart-packaging/automated-robotic-truck-loader-optimizes-shipping-space.

Newcombe et al., "KinectFusion: Real-Time Dense Surface Mapping and Tracking," Proceedings of the 2011 10th IEEE International Symposium on Mixed and Augmented Reality, IEEE Computer Society, Washington, DC, 2011, p. 127-136.

Nießner, M. et al., "Real-time 3D Reconstruction at Scale using Voxel Hashing," ACM Transactions on Graphics (TOG), 2013.

Okutomi et al., "A Multiple-Baseline Stereo," IEEE Transactions on Pattern Analysis and Machine Intelligence, Apr. 1993, pp. 353-363, vol. 15, No. 4.

Schulman, John et al., "Finding Locally Optimal, Collision-Free Trajectories with Sequential Convex Optimization," Robotics: Science and Systems (RSS), 2013, 10 pages.

Tsai et al., "A New Technique for Fully Autonomous and Efficient 3D Robotics Hand/Eye Calibration," IEEE Transactions on Robotics and Automation, 1989, pp. 345-358.

U.S. Appl. No. 14/212,328, filed Mar. 14, 2014.

* cited by examiner

OBJECT SEGMENTATION BASED ON DETECTED OBJECT-SPECIFIC VISUAL CUES

BACKGROUND

Unless otherwise indicated herein, the materials described in this section are not prior art to the claims in this application and are not admitted to be prior art by inclusion in this section.

Robotic systems, such as a robotic arm containing a gripping component, may be used for applications involving picking up or moving objects. For instance, a robotic device may be used to fill a container with objects, create a stack of objects, or unload objects from a given area. In some cases, all of the objects may be of the same type. In other cases, a container or truck may contain a mix of different types of objects, such as boxed items, cans, tires, or other objects of varying weights and sizes. Such robotic systems may direct a robotic arm to pick up objects based on predetermined knowledge of where objects are in the environment. Such robotic systems may also direct a robotic arm to pick up objects based on predetermined knowledge of what types of objects the robotic arm can manage (e.g., based on whether a gripper or other robotic manipulator can support a weight of the object while moving or otherwise interacting with the object at various accelerations).

SUMMARY

The present application discloses implementations that relate to determining and modeling admissible forces for grippers of robotic devices. In one aspect, the present application describes a method. The method may involve receiving one or more images of a physical environment, where the one or more images include one or more objects. The method may also involve determining a type of surface feature predicted to be contained on a portion of one or more surfaces of a single object. The method may further involve identifying, by the one or more processors, surface features of the type within regions of the one or more images. The method may still further involve, based on the identified surface features, associating the regions of the one or more images to corresponding objects in the physical environment. The method may yet still further involve, based at least in part on the regions associated to the corresponding objects, determining, by the one or more processors, a virtual representation of the physical environment including at least one distinct object segmented from a remaining portion of the physical environment so as to virtually distinguish a boundary of the at least one distinct object from boundaries of objects present in the remaining portion of the physical environment.

In another aspect, the present application describes a non-transitory computer readable medium having stored thereon instructions that, upon execution by a computing device, cause the computing device to perform operations. The operations may include receiving one or more images of a physical environment, where the one or more images include one or more objects. The operations may also include determining a type of surface feature predicted to be contained on a portion of one or more surfaces of a single object. The operations may further include identifying surface features of the type within regions of the one or more images. The operations may still further include, based on the identified surface features, associating the regions of the one or more images to corresponding objects in the physical environment. The operations may yet still further include, based at least in part on the regions associated to the corresponding objects, determining a virtual representation of the physical environment including at least one distinct object segmented from a remaining portion of the physical environment so as to virtually distinguish a boundary of the at least one distinct object from boundaries of objects present in the remaining portion of the physical environment.

In still another aspect, the present application describes a system. The system may include at least one processor, and data storage comprising instructions executable by the at least one processor to cause the system to perform operations. The operations may include receiving one or more images of a physical environment, where the one or more images include one or more objects. The operations may also include determining a type of surface feature predicted to be contained on a portion of one or more surfaces of a single object, the portion being different from a full length of a boundary of the one or more surfaces of the single object. The operations may further include identifying surface features of the type within regions of the one or more images. The operations may still further include, based on the identified surface features, associating the regions of the one or more images to corresponding objects in the physical environment. The operations may yet still further include, based at least in part on the regions associated to the corresponding objects, determining a virtual representation of the physical environment including at least one distinct object segmented from a remaining portion of the physical environment so as to virtually distinguish a boundary of the at least one distinct object from boundaries of objects present in the remaining portion of the physical environment.

In yet another aspect, a system is provided that includes a means for receiving one or more images of a physical environment, where the one or more images include one or more objects. The system may also include a means for determining a type of surface feature predicted to be contained on a portion of one or more surfaces of a single object, the portion being different from a full length of a boundary of the one or more surfaces of the single object. The system may further include a means for identifying surface features of the type within regions of the one or more images. The system may still further include a means for, based on the identified surface features, associating the regions of the one or more images to corresponding objects in the physical environment. The system may yet still further include a means for, based at least in part on the regions associated to the corresponding objects, determining a virtual representation of the physical environment including at least one distinct object segmented from a remaining portion of the physical environment so as to virtually distinguish a boundary of the at least one distinct object from boundaries of objects present in the remaining portion of the physical environment.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Figure 1A:
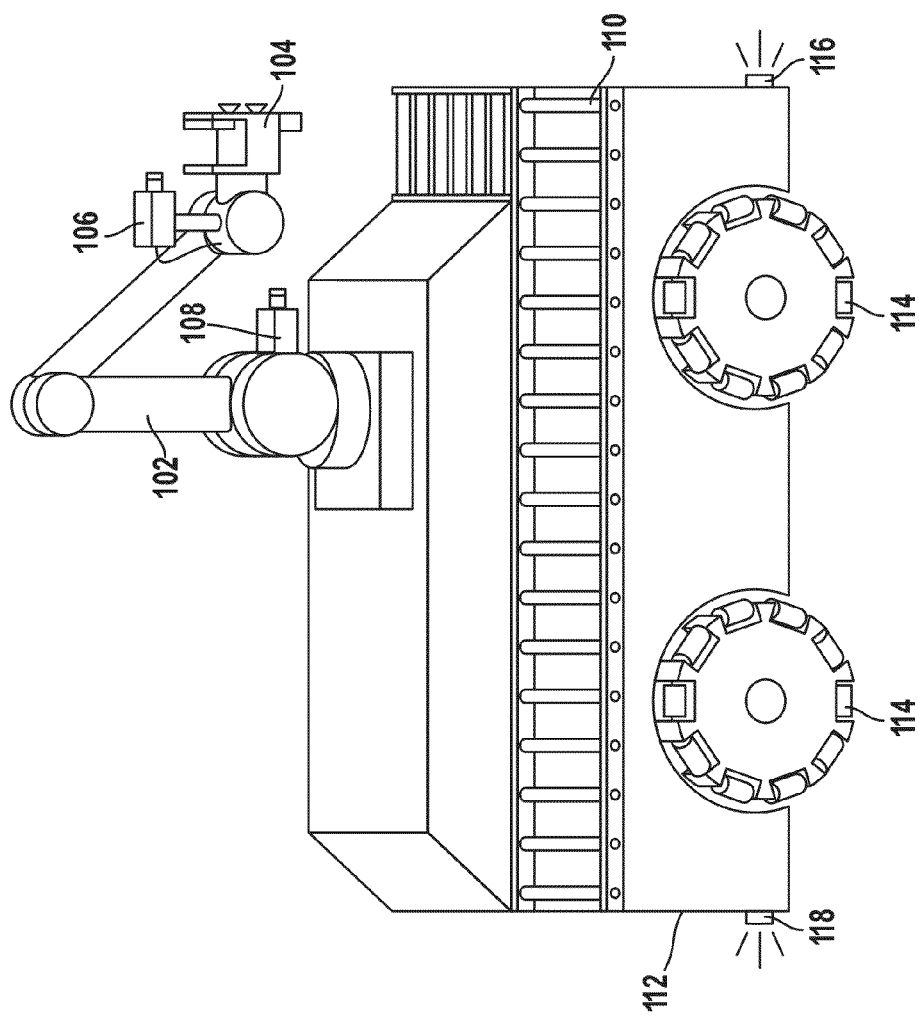
FIG. 1A shows a robotic arm mounted on a moveable cart, according to an example implementation.

Example methods and systems are described herein. Any example implementation or feature described herein is not necessarily to be construed as preferred or advantageous over other implementations or features. The example implementations described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other implementations might include more or less of each element shown in a given Figure. Further, some of the illustrated elements may be combined or omitted. Yet further, an example implementation may include elements that are not illustrated in the Figures.

In the following description, the terms "sensor," "camera," or "optical sensor" may be used interchangeably and may refer to device or devices (mono or stereo arrangements) configured to perform three-dimensional (3D) image sensing, 3D depth sensing, two-dimensional (2D) image sensing, 2D depth sensing (i.e., 2D image and corresponding depth map), and/or other types of sensing of a physical environment of the device.

Furthermore, the term "box" may be used herein to refer to a box or other physical object that may be present in a physical environment of a robotic or computing device and that may be detected and segmented in accordance with at least some of the operations described herein.

In some scenarios, physical objects such as boxes that are piled together may be difficult to segment by a computer-controlled robotic system during object recognition. Box features such as printed lines, flaps, creases, etc. may impede the system's ability to segment boxes correctly because the system may mistake such features for boundaries of the boxes. Accordingly, it may be advantageous to detect visual cues such as tape and other surface features of a box (e.g., barcodes, stickers, logos) to help segment boxes from other boxes.

To facilitate this, the system may make segmentation decisions based on features of boxes that may commonly occur in practice. For instance, the top flaps of a box may typically be taped together with wide tape, and tape may also be present on side surfaces of a box as well. As such, the system may determine that the tape that is adhered to the top flaps of the box may not be a boundary of the box since the flaps are often taped together in a center of a surface of the box. Further, the system may determine that piece of tape does not indicate a boundary of the box because tape may not cover more than just a small portion of an edge of a box. Still further, other features such as barcodes, stickers, and logos may not usually be wrapped around two surfaces of one box or split between two adjacent boxes, and thus the system may segment boxes based on detection of such features. These features and others that may not be located on boundaries of boxes can help a system distinguish between box faces and thus help segment between boxes.

In an example implementation, the system may receive images of a physical environment. The physical environment may include various objects, and thus the images may also include images of the objects. The images may be of various types, such as depth map images, color/intensity images, and gradient images, among other possibilities. Further, the images of the objects may be captured by an optical device in sequence at various poses.

The physical environment may then be reconstructed in 3D as a virtual volumetric representation based on poses of the optical device associated with the images. The 3D virtual representation may be projected in the environment orthographically, resulting in a projected intensity image, a projected depth image, and/or a projected normal image (e.g., an image that contains normals). The system may then employ one or more object recognition algorithms to determine various object hypotheses and segment the objects based on detected features.

The system may determine a type (or types) of surface feature that is predicted to be contained on a portion of one or more surfaces of a single object. Examples of such surface features may include tape, barcodes, stickers, logos, etc. that may have a high likelihood of being contained to one surface of an object and not split between two adjacent objects or split between (e.g., wrapped around) two surfaces of the same object.

The system can then identify surface features of the type(s) within various regions of the projected images or regions of the individual original images captured by the optical sensor. The identified features may indicate, for instance, that a particular current "box hypothesis" (e.g., an estimated region that corresponds to a box face) determined by the system is a valid box, where a box hypothesis represents estimated boundaries of distinct objects in the physical environment, such as estimated boundaries of a single box face of a box. As an example, the system may identify tape as a surface feature by detecting changes in illumination and intensity among successive images taken from different positions that are used for 3D volume reconstruction. Such a change in illumination may result from tape or another material that may be reflecting light and from different positions and angles of light on the objects. The term "box hypothesis" may also refer to hypotheses associated with other types of physical objects as well.

Generally, within example implementations herein, the presence of these surface features within or on a boundary of a particular box hypothesis may raise or lower a confidence score of the particular box face, which may then be input to a global system for determining an optimal set of box hypotheses associated with the given image(s) and thereby facilitate an optimal segmentation.

The system may also identify tape or other surface features by adjusting an image of a box hypothesis and then identifying line segments on the adjusted image that may represent tape, barcodes, or other features. For instance, as noted above, the system may have predetermined notions of where tape may be located on the box. The system may also identify portions of the adjusted image or other images of a box hypothesis that have different colors and intensities than the rest of that box hypothesis (e.g., tape may appear at a higher intensity than the rest of a box face).

In some scenarios, the system may determine the segmentation based on the identified line segments in the adjusted image of the box hypothesis. Further, the system may determine a template of a box face or other object surface and compare the template with the adjusted image of the box hypothesis. Still further, the system may determine a confidence score associated with the segmentation based on a trained feature classifier configured to distinguish between true positives and false positives of determined segmentations.

Based on the identified surface features, the system may then associate the regions of the one or more images to corresponding objects in the physical environment. Then, based at least in part on the regions associated to the corresponding objects, the system may determine a virtual representation of the physical environment where boundaries of objects are virtually distinguished and segmented from boundaries of other objects present in the rest of the environment.

Various additional examples are described below, therefore the above examples are not meant to be limiting. Many examples refer to use of methods and systems for segmenting boxes. However, example methods and systems may be used to segment any number of objects from other objects within an environment, or to distinguish an object from other regions of the environment based on object-specific features.

Reference will now be made in detail to various implementations, examples of which are illustrated in the accompanying drawings. In the following detailed description, numerous specific details are set forth in order to provide a thorough understanding of the present disclosure and the described implementations. However, the present disclosure may be practiced without these specific details. In other instances, well-known methods, procedures, components, and circuits have not been described in detail so as not to unnecessarily obscure aspects of the implementations.

While some robotic devices may be fixed at a location in an environment, in some implementations, a robotic device can be made mobile by coupling the robotic device with a wheeled base, a holonomic base (e.g., a base that can move in any direction), or rails on the ceiling, walls or floors. According to various implementations, a robotic manipulator may be mounted on a holonomic base (e.g., a base with wheels that allow the base to move in any direction). FIG. 1A depicts an exemplary holonomic base containing a robotic manipulator. In some implementations, a moveable base 112 may include a robotic arm 102 mounted on the base 112. The robotic arm 102 may contain a gripping component 104 for gripping objects within the environment. The base may contain one or more wheels 114, which may be holonomic wheels that operate with two degrees of freedom. In further implementations, a wraparound front conveyor belt 110 may be included on the holonomic base 112. In some examples, the wraparound front conveyer belt 110 may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In still other examples, one or more robotic manipulators may be mounted on rails of a truck or container. In such examples, the robotic manipulators may be used to load or unload the truck or container.

Figure 1B:
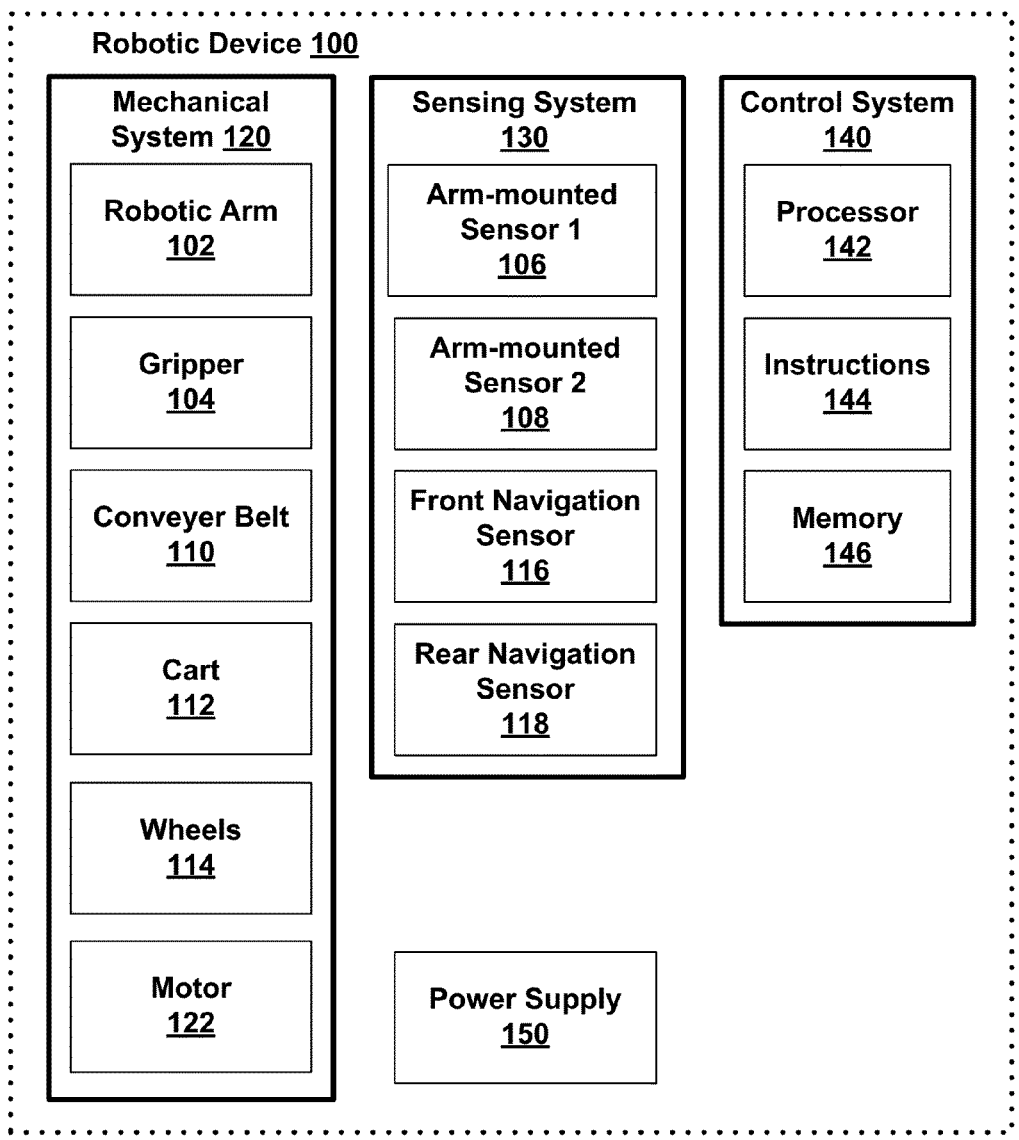
FIG. 1B is an operational block diagram illustrating a robotic device, according to an example implementation.

FIG. 1B is a functional block diagram illustrating a robotic device 100, according to an example implementation. The robotic device 100 could include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described operations of the robotic device 100 may be divided up into additional operational or physical components, or combined into fewer operational or physical components. In some examples, additional operational and/or physical components may be added to the examples illustrated by FIGS. 1A and 1B.

The mechanical system 120 may include components described above with respect to FIG. 1A, including a robotic arm 102, a gripper 104, a conveyer belt 110, a (movable or holonomic) base 112, and one or more wheels 114. The mechanical system 120 may additionally include a motor 122, which may be an electric motor powered by electrical power, or may be powered by a number of different energy sources, such as a gas-based fuel or solar power. Additionally, motor 122 may be configured to receive power from power supply 150. The power supply 150 may provide power to various components of robotic device 100 and could represent, for example, a rechargeable lithium-ion or lead-acid battery. In an example implementation, one or more banks of such batteries could be configured to provide electrical power. Other power supply materials and types are also possible.

The sensing system 130 may use one or more sensors attached to a robotic arm 102, such as sensor 106 and sensor 108, which may be 2D sensors and/or 3D depth sensors that sense information about the environment as the robotic arm 102 moves. The sensing system 130 may determine information about the environment that can be used by control system 140 (e.g., a computer running motion planning software) to pick and move boxes efficiently. The control system 140 could be located on the device or could be in remote communication with the device. In further examples, scans from one or more 2D or 3D sensors mounted on a mobile base, such as a front navigation sensor 116 and a rear navigation sensor 118, and one or more sensors mounted on a robotic arm, such as sensor 106 and sensor 108, may be integrated to build up a digital model of the environment, including the sides, floor, ceiling, and/or front wall of a truck or other container. Using this information, the control system 140 may cause the mobile base to navigate into a position for unloading or loading objects, for instance.

Within examples, the robotic arm 102 may be equipped with a gripper 104, such as a digital suction grid gripper. In such implementations, the gripper may include one or more suction valves that can be turned on or off either by remote sensing, or single point distance measurement and/or by detecting whether suction is achieved. In additional examples, the digital suction grid gripper may include an articulated extension. In some implementations, the potential to actuate suction grippers with rheological fluids or powders may enable extra gripping on objects with high curvatures. Other types of grippers are possible as well.

In some implementations, the gripper could potentially span several boxes or objects and turn on suction for some or all of the covered objects. In some implementations, the suction or adhesion devices may be a "digital" grid so that the robotic device can turn on any number of the suction devices as will fit boxes sensed for grabbing. In some implementations, the system may notice a seam in the boxes (separation between adjacent boxes) such that suction devices can be activated on both sides of the seam to pick up both boxes at once, thereby doubling the throughput. In some implementations, the suction devices can sense after a certain amount time whether they can successfully grip a surface, after which they may automatically shut off. In further implementations, sections of the suction devices can fold down to grasp the top of the boxes. For instance, grippers can initially start at full extension and then conform to the surface being gripped.

In further examples, the robotic arm can implement a wiggle movement to improve a suction grip. In additional implementations, the robotic arm can wiggle a box side-to-side to help segment the box from its surroundings. In other implementations, the arm can wiggle upon pick up of the box to avoid jostling other objects. In such implementations, when trying to adhere to an object in order to pick it up using suction, the robotic arm may employ a wiggle motion in order to make a firm seal against the object. In further examples, the robotic arm may wiggle the object as the robotic arm is picking up the object so that the box can more gently break friction or overlap contact with other items. This may help avoid a situation where pulling the object up too directly or too quickly causes other items to be tossed into the air. According to various implementations, physical objects can have concave, convex or otherwise rumpled faces that make it hard for a suction device to adhere to. Thus, wiggling the suction device as the device makes suction contact may enable a more reliable grip on physical objects, both planar and non-planar objects.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various implementations, cues such as barcodes, texture coherence, color, 3D surface properties, or printed text on the surface may also be used to identify an object and/or find its pose in order to know where and/or how to place the object (e.g., moving the object slowly due to the object being fragile). In some implementations, shadow or texture differences may be employed to segment objects as well.

Many or all of the operations of robotic device 100 could be controlled by control system 140. Control system 140 may include at least one processor 142 (which could include at least one microprocessor) that executes instructions 144 stored in a non-transitory computer readable medium, such as the memory 146. The control system 140 may also represent a plurality of computing devices that may serve to control individual components or subsystems of the robotic device 100 in a distributed fashion.

In some implementations, memory 146 may contain instructions 144 (e.g., program logic) executable by the processor 142 to execute various operations of robotic device 100, including those described above in connection with FIGS. 1A-1B. Memory 146 may contain additional instructions as well, including instructions to transmit data to, receive data from, interact with, and/or control one or more of the mechanical system 120, the sensor system 130, and/or the control system 140.

Figure 2A:
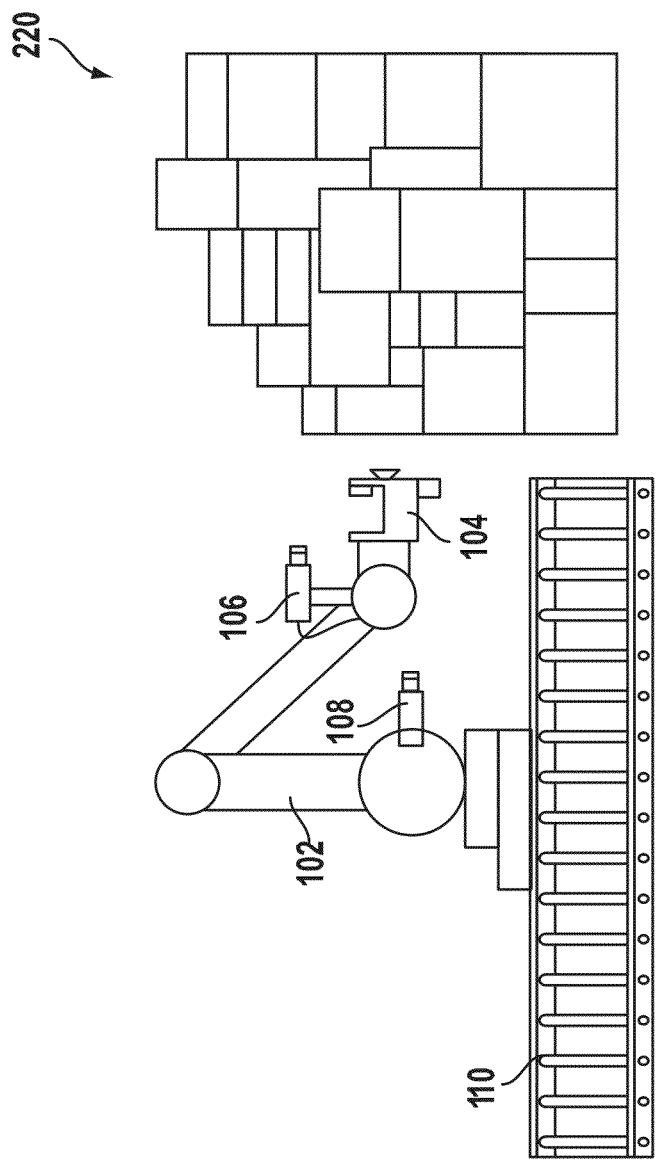
FIG. 2A shows a robotic arm and a stack of boxes, according to an example implementation.

According to various implementations, a perception guided robot is described. For instance, a robotic device may utilize a combination of perception together with planning to guide the robot arm to pick up a box and place the box where it needs to go. FIG. 2A illustrates part of the robotic device from FIG. 1A with a stack of boxes, according to an example implementation. As shown, the robotic device may include a robotic arm 102 with a gripping component 104, sensors 106 and 108, and conveyer 110 as described above. In some examples, the robotic device could be mounted on a holonomic base as described with respect to FIG. 1A, could be mounted on a different type of movable apparatus, could be mounted on rails or tracks, or could be stationary. The robotic device may be controlled to pick boxes from a stack of boxes 220 containing a heterogeneous mix of shapes and sizes of boxes.

Figure 2B:
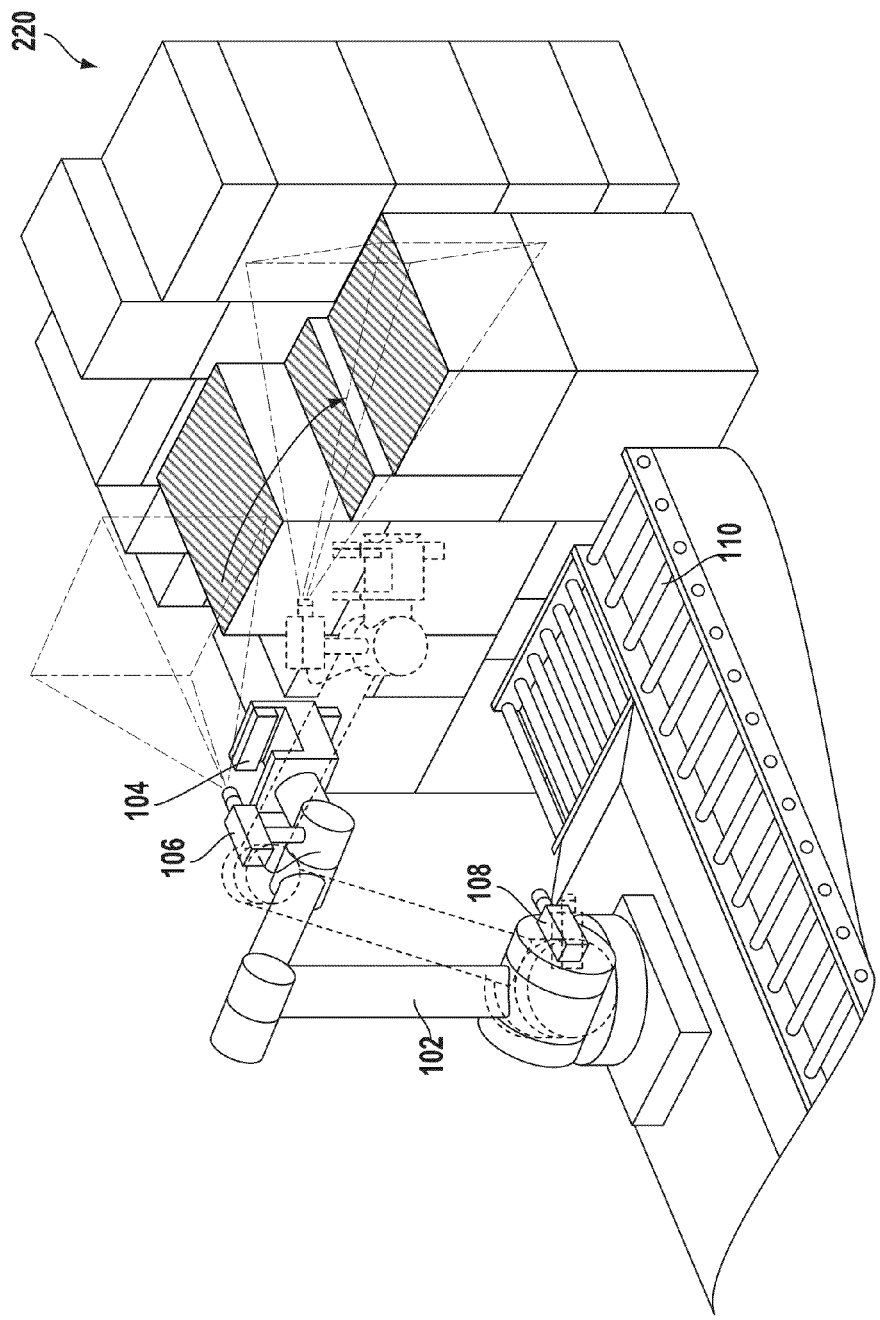
FIG. 2B shows scanning of the stack of boxes from FIG. 2A by a sensor mounted on the robotic arm, according to an example implementation.

Within examples, a virtual environment including a model of the objects in 2D and/or 3D may be determined and used to develop a plan or strategy for picking up the boxes. In some examples, the robot may use one or more sensors to scan an environment containing objects, as shown in FIG. 2B. As the robotic arm 102 moves, a sensor 106 on the arm may capture sensor data about the stack of boxes 220 in order to determine shapes and/or positions of individual boxes. In additional examples, a larger picture of a 3D environment may be built up by integrating information from individual (e.g., 3D) scans. Sensors performing these scans may be placed in fixed positions, on a robotic arm, and/or in other locations. According to various implementations, scans may be constructed and used in accordance with any or all of a number of different techniques.

In some examples, scans can be made by moving a robotic arm upon which one or more 3D sensors are mounted. Feedback from the arm position may provide pose information about where the sensor is positioned and may be used to help with the integration. Alternately, or additionally, scans may be made using one or more 2D sensors, for instance by leveraging motion and tracking key-points in the environment. In further examples, scans may be from fixed-mount cameras that have fields of view (FOVs) covering a given field. In additional examples, scans may be visually registered to help with fine pose estimation, potentially giving better integration results.

In further examples, a virtual environment may be built up using a 3D volumetric or surface model to integrate information (e.g., from different sensors). This may allow the system to operate within a larger environment, such as in cases where one sensor may be insufficient to cover a large environment. Such techniques may also increase the level of detail captured, which may help the robotic device perform various tasks. In particular, integrating information can yield finer detail than from a single scan alone (e.g., by bringing down noise levels). This may enable better object detection, surface picking, or other applications.

In further examples, wide-angle environment reconstruction may be performed by sensing an environment and extracting that information into a simplified geometric model of simple mathematical 3D geometric forms (e.g., planes, cylinders, cones, hemispheres, etc.). In some instances, such techniques may make motion planning easier and/or may make violation of the models (e.g., collisions) easier to detect. Alternately, or additionally, such techniques may allow a parametric description to extend the environment. For instance, the ground may be treated as a plane that extends behind objects that occlude it.

In additional examples, planes or other mathematical surfaces in the environment may be extracted in 3D. These known "ideal" surface detections may be combined into a more accurate model of the environment. For instance, planes may be used to determine the full extents of walls (or mathematical description thereof) and other obstacles to avoid collisions and detect the locations of objects of interest. Also, mathematical representations of objects may be used to look for anomalies such as a person entering into an environment. Such events may violate the ideal model, which may make their detection easier.

In other examples, certain objects such as boxes may have simple planar form. For instance, a metal object may have a geometric form of a cylinder and a tire may have a geometric form of a torus. Example systems may leverage this trait of certain objects in order to model them and/or determine how to motion plan for the objects. For instance, known templates of certain shapes can be used to refine detected features of objects within the environment that appear to match a particular shape.

In some examples, 2D and 3D information may be represented at least in part via one or more facades. A facade may be defined as a near-planar construct containing a set of objects, represented as a depth map (e.g., a 2D map with distances as a third dimension). Examples of facades may include a wall of boxes in a truck, a top of a pallet stack containing boxes or other objects, or a top of a bin of jumbled objects.

Figure 2C:
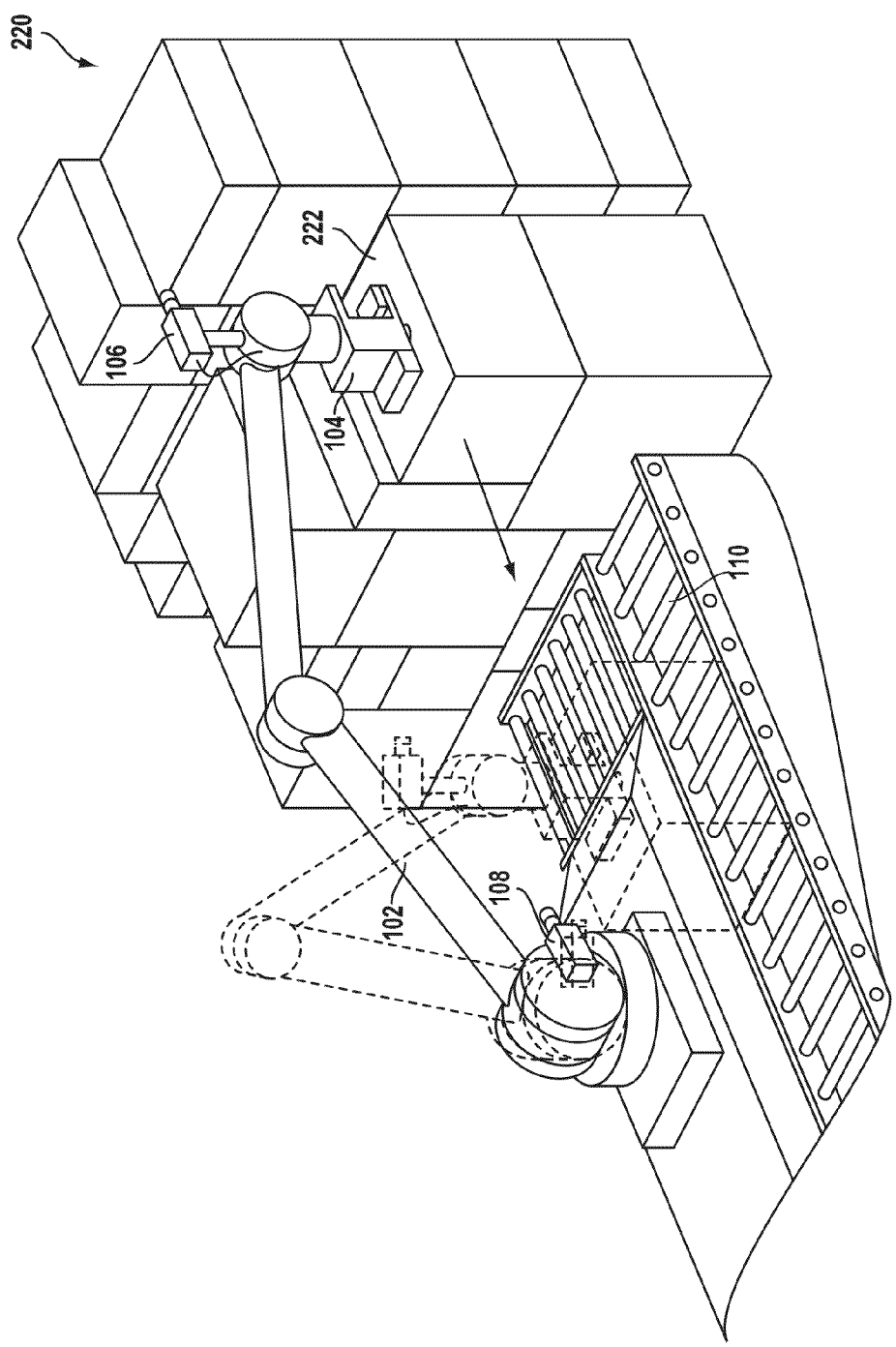
FIG. 2C shows the robotic arm from FIG. 2A moving a box, according to an example implementation.

In further examples, a facade may be constructed from boxes, for instance to plan an order for picking up the boxes. For instance, as shown in FIG. 2C, box 222 may be identified by the robotic device as the next box to pick up. Box 222 may be identified within a facade representing a front wall of the stack of boxes 220 constructed based on sensor data collected by one or more sensors, such as sensors 106 and 108. A control system may then determine that box 222 is the next box to pick, possibly based on its shape and size, its position on top of the stack of boxes 220, and/or based on characteristics of a target container or location for the boxes. The robotic arm 102 may then be controlled to pick up the box 222 using gripper 104 and place the box 222 onto the conveyor belt 110 (e.g., to transport box 222 into a storage area).

In additional examples, a facade may be represented as an orthographic projection of 3D surface information. This representation may allow for parsing the facade to determine interesting areas for a particular application. For example, in truck unloading, the upper left corner of the next box to pick up may be determined based on a facade representation. In other examples, an orthographic projection of an integrated 3D environment may be determined to give a wide-FOV, easily-parsed representation for performing application-related tasks. One such task may be finding the corner or corners (e.g., top left) of a box to pick. Another such task may involve finding good surfaces (e.g., relatively flat and large) for picking objects out of a bin.

In further examples, a 3D model of a stack of boxes may be constructed and used as a model to help plan and track progress for loading/unloading boxes to/from a stack or pallet. Any one actual camera view of the facade may suffer from point of view occlusions and perspective distortion. Accordingly, multiple RGBD views via robot arm movements and/or different views from a base or fixed locations may be combined to create a single facade of the boxes to be picked.

In other examples, the 3D model may be used for collision avoidance. Within examples, planning a collision-free trajectory may involve determining the 3D location of objects and surfaces in the environment. A trajectory optimizer may make use of the 3D information provided by environment reconstruction to optimize paths in the presence of obstacles. In further examples, the optimizer may work in real time and may accept many kinds of constraints. As an example of such a constraint, the optimizer may attempt to keep the end effector level throughout the trajectory.

In additional examples, an environment may be captured as a mesh or set of 3D points. A robot arm may be represented as a convex hull of plane segments for quick collision checking Constant or frequent updating of the environment may allow the robot arm to quickly respond to changes. In further examples, an optimizer may perform frequent continuous collision checking throughout its path. An optimizer may accept arbitrary constraints in the form of costs, such as to keep a certain distance away from objects or to approach a goal position from a given angle. Additionally, an optimizer may avoid robot fault conditions by working in joint space, keeping track of windup and choosing goal positions from among multiple inverse kinematics solutions. One strategy for motion planning may involve looking ahead several moves to see if the chosen goal joint position will be acceptable for the next move.

In some implementations, path constraints, such as collision avoidance for robotic arms, cameras, cables, and/or other components, may be put in a constraint based planning solver and solved for to yield a best path to move the arm for perception. Additionally, in some implementations, the solver may determine a best path for picking up, moving, and placing an object.

In order to determine a virtual reconstruction of a physical environment of a robotic manipulator, a computing device or system may receive one or more images of one or more objects in the physical environment, such as boxes. The images of the objects may be captured by one or more sensors in sequence at various poses (i.e., positions and orientations) of the sensor(s) and/or of the objects themselves. Thus, respective images may correspond to respective different views of the objects. The images may be of various types, such as color/intensity images, gradient images, and depth map images (i.e., images representative of distances between respective surfaces of the objects and a reference plane associated with a perspective of the sensor(s) that capture the images), among other possibilities. As noted above, the objects may take the form of cuboid-shaped (or other shaped) objects, such as boxes, that are stacked in or otherwise occupy the physical environment, for instance.

In some examples, the one or more images may include various facades of a stack of boxes (i.e., a near-planar group of boxes) from different viewpoints. For instance, when the physical objects are a stacked pallet of boxes in the physical environment, the images may include at least one side view facade of the stacked pallet of boxes, at least one top-down view facade of the stacked pallet of boxes, and/or other variations on these viewpoints (i.e., perspective views). In some implementations, one frontal view or one top view of stacked boxes may be used.

After receiving the one or more images, the computing device or system may virtually reconstruct the physical environment based on the one or more images, a pose of the sensor(s) used to capture the images, and in some scenarios, additionally or alternatively based on other information obtained by sensors such as depth and visual cameras. A reconstruction of the environment may facilitate operations relating to object segmentation, including but not limited to operations described herein. A reconstruction of the environment may be represented, for example, as a point representation, surface representation, or volumetric representation. In one particular example, the computing device may reconstruct the environment in 3D using a volumetric device, such as a Truncated Signed Distance Function (TSDF), which allows for efficient integration of depth images for a wider FOV and lower noise. Generally, the TSDF reconstruction of the environment comprises implicit information about the surfaces present in the volume.

In some examples, a TSDF volume may comprise a regular 3D grid containing a signed scalar field indicating the distance to the nearest depth point. For each depth pixel in an input image, a projected ray may be averaged into the volume, with a zero value in the cell exactly at the 3D position of the depth pixel, where positive values are closer to the camera along the ray, and negative values are further away from the camera. The computing device may integrate together successive depth images that are registered to this volume. In such examples, the computing device may add information from a visual camera as well, in addition to the depth information, as noted above. To facilitate this, the visual camera may be calibrated in accordance with the depth camera, and the depth image may be re-projected to the frame of the visual camera so that their images correspond to the same (visual camera) viewpoint. Then, at cells in the volume along the projecting ray from the depth pixel that lie within a threshold distance from the zero value cell, visual RGB information may also be averaged into the volume cells along the ray.

As a further example aspect of volume reconstruction, each cell may also include information about whether that cell occurs at the edge of the projected depth/visual image. In a scenario where the computing device re-projects the volume to a height map, such information may be used to determine where there are "false edges" in the height map (i.e., edges that arise from the aperture edges of the input images).

As a further example aspect of volume reconstruction, the computing device may take into account a confidence in the depth reading. For instance, readings that are further away from the camera, or that strike a surface at a glancing angle, are discounted by the computing device. As such, more confident information may have more of an effect during integration, which may improve the quality of the environment reconstruction.

In some aspects, the computing device may also subtract information, for example, when an object is removed or the environment changes for any other reason, and when new information contradicts the old information. The TSDF may handle situations such as this by gradually averaging in the new information, which can take a significant number of new views before older, invalid surfaces are removed.

To facilitate quick removing of information, the computing device may implement one or more methods. In a first method, the computing device may have predetermined that it will be loading, unloading, or otherwise interacting with an object such as a box. For instance, the computing device may know a region of the box (e.g., the coordinates and dimensions of the box), and may erase this region from the TSDF volumetric representation, setting the region to a zero state. This erasure may cause errors, and thus, the computing device may gradually smooth the outlines of the removed box. In a second method, the computing device may enforce a strong erasure constraint on each ray that is projected into the volume. Instead of just changing the TSDF volumetric representation in the vicinity of the 3D depth point, the computing device may zero out all cells along the ray, from the camera to a certain distance in front of the 3D depth point. Such a process may cause the environment to change much more rapidly in dynamic situations, without ruining the integration of areas that are stable. Other example methods for quickly removing information from images are possible as well.

In some scenarios, the computing device may need to extract either points or explicit surface information as the input to other algorithms (e.g., obstacle avoidance applications). To facilitate this, the computing device may implement one or more of several different algorithms. For instance, the computing device may project the TSDF volumetric representation onto a planar surface in the form of a height map, the height map being an image whose pixel values represent the distance of the nearest surface along a ray perpendicular to the surface (for orthographic projection), or through a focal point (pinhole projection).

In addition to the height map, the computing device can obtain a similar visual map by projection, since the TSDF volumetric representation contains RGBD values at each cell. Such a visual map may take the same format as the height map. Information in the height map may be color-coded by depth.

In an example application of height maps, the computing device may determine the location of boxes in the physical environment. Every face of a rectangular-sided box may be a planar segment that projects onto an orthographic height map as a parallelogram or other shape. Thus, in order for the computing device to find rectangular box faces, the computing device may look for parallelograms in the height map using line segments from both visual and depth height maps, or using other methods.

As noted above, the TSDF or other 3D volumetric representation of the physical environment may be orthographically projected as height maps (e.g., an X-Y plane height map or a Y-Z plane height map), thereby resulting in a projected color/intensity image, a projected depth image, and a projected normal image of the environment. Some or all of the 3D data points (i.e., 3D point cloud) that make up the volumetric representation may be projected two-dimensionally onto a reference plane associated with the perspective of the sensors that captured the images used for generating the volumetric representation. For instance, the reference plane may be substantially orthogonal to a surface on which the physical objects are placed and/or substantially parallel to a nearby wall or other vertical surface in the physical environment. The reference plane may intersect some or all of the physical objects of the environment, or may be separate from the objects (i.e., behind the objects, such as parallel to a nearby wall). In other examples, the reference plane may be angled and orthogonal to a sightline of one or more of the sensors when the given sensor viewpoint of the facade is a perspective viewpoint.

In some examples of detection and segmentation of physical objects—boxes, in particular—the computing device may identify line, corner, contour and plane features, and use these features in accordance with a method for box hypotheses generation. Such a method may use the orthographic projections of the depth, the normal, and the color/intensity image generated from a 3D virtual reconstruction of an environment. In these orthographic projections, boxes are observed as quadrilaterals, or parallelograms in particular. Such a method may involve operations such as: preprocessing orthographic images, extracting corner features and line features (e.g., line segments) from the preprocessed images, building initial reasonable hypotheses from combinations of line segments, combinations of corners, single planes, and corner-contours, refining the initial hypotheses, filtering out hypotheses with threshold high probability of being associated to a distinct object/surface, removing hypotheses that (i) have more than one plane on which the hypotheses lie on, (ii) contain a significant portion of the background of the physical environment, and (iii) are identical, and performing global reasoning based on assumptions and predictions that a given set of physical objects may not overlap.

Such a method should not be limited to these operations. For instance, some implementations may involve reweighting the probability of box hypotheses based on other detectable features that boxes or other physical objects may include. Other operations are possible as well.

In some implementations, such a method may be divided into different modules which may be processed in successive order. The modules may be associated with one or more of the operations described above. For example, at the first module, a data preprocessing module, all planes which are skewed beyond a given threshold with respect to the one or more optical sensors may be filtered out. A plane associated with the floor on which the boxes are placed may also be filtered out. Then, the computing device may compute a multi-channel edge image for template matching that incorporates the orthographic normal, color/intensity and depth projection image (e.g., normal, color and depth maps) from the reconstructed 3D virtual environment. This may result in a multi-modal gradient orientation image and a corresponding magnitude image. To compute an edge map, the computing device may implement different weighting of the modalities. After computation of the edge map, the computing device may compute all the line, corner, contour, and plane features mentioned above using the normal, color, depth, multi-modal orientation and magnitude images.

At the next module, a box hypothesis generation module, one or more different types of box hypotheses generation approaches may be used. Each approach may use some basic dimension constraint checks initially, which check if a box violates predefined dimensions. If so, that box may be removed. One approach may be box hypothesis by plane feature. In this approach, the computing device may construct a parallelogram that is made up by one plane found within the current scene. If the plane is well explained by the box, and the box is at least partially covered by the plane, that plane may be used as a potential box hypothesis.

In another approach, box hypothesis may be performed using two diagonal opposite corner features. Namely, two diagonal opposite corner features that lie on the same plane may provide all necessary information to build up a parallelogram (by using the corner locations and their respective orientation of their four corner "arms" in total). As such, the computing device may use the underlying gradient orientation and magnitude values to optimize the orientation of the corner arms.

In still another approach, box hypothesis may be performed using two opposite corner features and a contour. Namely, two opposite corner features that lie on the same plane may serve as one baseline. This baseline and the corresponding opposite contour of the plane may serve as two parallel sides of a parallelogram. The other two sides may be provided by the intersection of the corner feature arms which are not incorporated into the baseline and the contour line. The result of the four sides may make up a particular parallelogram. The box hypothesis may consist of one previously detected plane, and may be invalid if there is more than one previously detected plane.

In yet another approach, box hypothesis may be performed using four line features. Namely, four line segments which are approximately perpendicular in 3D may comprise a parallelogram. Each line segment may be required to cover at least a certain percentage of the corresponding border of the resulting parallelogram in order for the computing device to determine that the given box hypothesis is valid. The box hypothesis may consist of one previously detected plane, and may be invalid if there is more than one previously detected plane.

At the next module, a verification and refinement module, the computing device may verify and refine each of the generated box hypotheses based on at least a portion of the available data and known constraints. In one example, the computing device may verify and refine a box hypothesis that was created by two diagonal corner features. In this example, the computing device may create a band around each side of the parallelogram that was created, where every possible line in the band may be evaluated. For each of those lines, the computing device may compute similarity scores (i.e., "verification scores") based on a dot product of the normal of the line and the computed multi-modal gradient noted above. Finally, the computing device may select one parallelogram out of all possible parallelograms where the sum of the similarity scores is maximal under all parallelograms. If the best parallelogram is above a certain threshold, the computing device may process it further. Otherwise, that parallelogram may be rejected. This similarity score may be used later as a confidence score during global reasoning.

In another example, the computing device may verify and refine a box hypothesis that was created by a plane. In this example, the computing device may apply the same verification score method as noted above with respect to the previous example. However, all box hypotheses that are rejected may not be discarded, but rather still used with a low confidence value.

In still another example, the computing device may verify and refine a box hypothesis that was created by two opposite corner features and a contour. First, the computing device may optimize the baseline by computing every possible line within a band around the baseline and using the line which is best supported by the data (as in the first verification example). Next, the computing device may project a location of the two corner features onto the optimized baseline in order to obtain a start and an end point. Then, the computing device may use that line and the corresponding normal of the underlying plane to recompute the orientation of the template arms (i.e., the segments extending from each corner). The intersection of the two new template arms and the contour may serve as two adjacent lines to the baseline. Both of those adjacent lines may also be refined (similar as the baseline). Their average intersection with the contour gives a parallelogram. The confidence value of this refined box is the similarity score of the baseline and the two adjacent lines. Using this method of verification, the computing device may reject such a refined box if the similarity score is too low or the fourth line is not much supported by the contour pixels (i.e. the contour pixels are too far away from the constructed fourth line). This similarity score may be used later as a confidence score during global reasoning.

In yet another approach, the computing device may verify and refine a box hypothesis that was created by four line segments. Here, the method of verification and refinement may be the same as the method for verification and refinement of a box hypothesis that was created by two diagonal corner features. The computing device may determine whether the refined box hypothesis violates predetermined "box dimension constraints" and/or the perpendicularity of the box dimension constraints. Each box may have three different side lengths (e.g., a height, width, and depth), and the "box dimension constraints" refer to lengths of two of these sides that are included in a given box hypothesis. As such, the computing device may determine that a box hypothesis does not violate the box dimension constraints if (i) the lengths of the two sides fall within a predetermined range of lengths associated with the predetermined box dimension constraints (e.g., predetermined based on a multitude of known, different boxes) and/or (ii) the two side lengths substantially match one or more predetermined box dimension constraints. Thus, the only detected box hypotheses that may be considered are box hypotheses that have a given combination of side lengths that (i) are not too small or too large and (ii) substantially match predefined box sizes. If the computing device determines that a refined box violates such constraints, the corresponding box may not be further considered.

At the next module, a background and plane coverage check module, in order to check consistency of all box hypotheses, the computing device may determine whether each box hypothesis covers a significant part of the background and/or more than just one plane. As such, boxes that cover a significant part and/or more than just one place are removed from consideration.

At the next module, an identity check module, the computing device may remove duplicate box hypotheses in order to speed up global reasoning. Namely, the computing device may remove exact duplicates and also may remove box hypotheses which are substantially close to other box hypotheses.

At the last module, a global reasoning module, the computing device determines a more clear interpretation of a given facade. By implementing this module, the computing device can avoid overlapping box hypotheses in the final box detection results. First, however, the computing device may perform local reasoning. Namely, the computing device may determine, for each box hypothesis, whether there is a significant smaller box hypothesis that intersects this box hypothesis and whose depth-only similarity score is high enough to assume that the smaller box hypothesis is an actual box. When there is such a significant smaller box hypothesis, the computing device may determine that the larger box hypothesis is not an actual box and remove it from consideration.

For the global reasoning aspect, the computing device may first extract connected groups of box hypotheses where a box hypothesis belongs to one group if it occludes another box hypothesis within the group or is occluded by another box hypothesis within the group. Each box hypothesis may only belong to one group. For each group the computing device may build a connected undirected graph where two nodes are connected if the two corresponding box hypotheses don't overlap. The computing device may then attempt to find maximal cliques with this graph (i.e., subgraphs where each node (e.g., a box) is connected to all other nodes (e.g., other boxes)). Each clique may be weighted by factors such as the confidence scores of the included box hypotheses, the area of the box hypotheses (e.g., a number of pixels included in the box hypothesis), and the number of box hypotheses that belong to this clique (larger number means higher weighting). For instance, the weight (or "final confidence score") may equal a product of each of those factors. Lastly, the computing device may determine a sorting of all the weighted maximal cliques in decreasing order, and then use the one with the maximum score as a final global result for virtually distinguishing distinct objects in the images. Other examples of segmentation of physical objects are possible as well.

Operations relating to object segmentation based on detected object-specific visual cues (i.e., surface features) will now be discussed in more detail. Such operations may be used in addition to, used as an alternative to, and/or may modify one or more of the operations described above.

Figure 3:
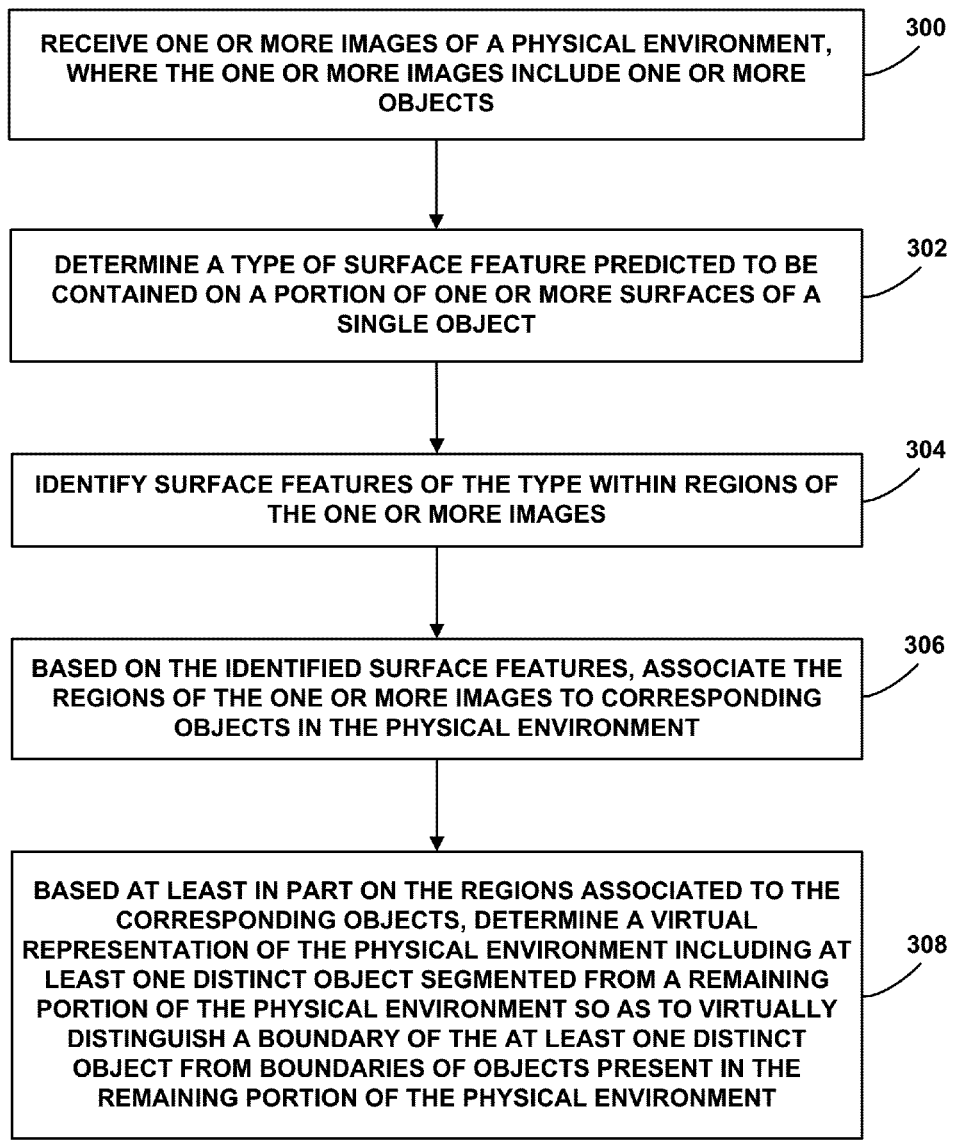
FIG. 3 is a flow chart of an example method, in accordance with at least some implementations described herein.

FIG. 3 is a flow chart of an example method for object segmentation based on detected object-specific visual cues. The method shown in FIG. 3 presents an implementation of a method that, for example, could be used with the systems shown in FIGS. 1A-2C, for example, or may be performed by a combination of any components of in FIGS. 1A-2C. In addition, such an implementation of a method could be carried out in accordance with the systems and aspects illustrated in FIGS. 4A, 4B, 5A, 5B, 6A, and 6B. The method may include one or more operations, or actions as illustrated by one or more of blocks 300-308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method and other processes and methods disclosed herein, the flowchart shows operation of one possible implementation of present implementations. In this regard, each block may represent a module, a segment, or a portion of program code, which includes one or more instructions executable by one or more processors for implementing specific logical operations or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method and other processes and methods disclosed herein, each block in FIG. 3 may represent circuitry that is wired to perform the specific logical operations in the process.

Operations described herein, including operations of the method, may be fully performed by a computing device or computing system, or may be distributed across multiple computing devices and/or a server.

At block 300, one or more images of a physical environment are received, where the one or more images include one or more objects. As discussed above, the images of the objects may be captured by one or more sensors in sequence at various poses (i.e., positions and orientations) of the sensor(s) and/or of the objects themselves. The "one or more images" may refer to images used to generate a volumetric representation of the physical environment, or may refer to the orthographically-projected color/intensity, depth, and normal images, or other orthographically-projected images.

At block 302, a type of surface feature predicted to be contained on a portion of one or more surfaces of a single object is determined. Types of surface features may include, for example, a piece of tape adhered to an object, a barcode contained on an object, a sticker coupled to an object, text printed onto an object, and an image printed onto an object (e.g., a logo), among other possibilities. A type of surface feature may be dependent on a type of object being segmented. In examples for segmenting boxes, tape, stickers, etc., as described above may be utilized as the surface feature. For other objects, object-specific features such as a handle on a coffee mug, may be used to segment the object.

Within examples, these types of surface features may be types that are predicted—possibly to a statistical threshold high certainty—to be contained to a portion of one or more surfaces of an object and predicted to not be split between two adjacent objects. The portion of the one or more surfaces of the single object may include (i) a portion of at least one edge of the single object beyond a threshold distance from corners of the single object, (ii) a portion beyond a threshold distance from edges and corners of the single object, and/or (iii) a portion that is different from (e.g., less than) a full length of an edge of a surface of the single object (i.e., a piece of tape may not be adhered to a full length of an edge). For instance, surface features such as tape may be predicted to be found substantially along a middle portion of a surface of a box, including a middle of at least one edge of the box. In addition, surface features such as tape, stickers, and the like, may not be wrapped around corners of a box. Some types of surface features may be types that are predicted to not be split between two surfaces, or faces, of the same object. For instance, stickers, barcodes, logos, other print, handle inserts/cutouts, etc., but not likely tape, may be located on a single surface of a single object, where some surface features are predicted to be a respective threshold distance away from edges and corners of the single object.

At block 304, surface features of the type are identified within regions of the one or more images. And, at block 306, the regions are associated to corresponding objects in the physical environment based on the identified surface features. The surface features may be identified based on various assumptions about one or more of the objects included in the physical environment. For instance, with respect to boxes, it may be expected that box flaps may meet in substantially the middle of a face of a box, and thus the computing device may look for tape. In addition, it may be expected that tape will have a different color/intensity than the rest of a box, such as a darker color/intensity. Other assumptions may be made about the surface features, with respect to boxes and other physical objects as well.

Within examples, surface features of the type may be identified within regions of one or more orthographic projections of the volumetric representation described above. Such regions of the one or more orthographic projections may then be associated to corresponding objects in the physical environment. Within other examples, surface features of the type may be identified within regions of the volumetric representation directly.

In some implementations, surface features of the type may be identified within regions that correspond to predetermined locations and/or predetermined dimensions of previously-identified surface features of the type contained on other known objects. For instance, based on previously-identified tape on previous boxes, the computing device may learn that tape may be between about 0.051 meters and about 0.076 meters wide.

By various iterations of object segmentation and machine learning, a computing device may increase the probability of detecting surface features of the type by searching the images for regions that resemble to a threshold high degree (or substantially match) regions of images that include previously-identified surface features of the type and that have facilitated previous object segmentations. As such, the computing device or a server with which the computing device communicates may have stored (e.g., in a database) images, volumetric representations, and segmented virtual representations associated with previous objects in previous physical environments. The computing device may access these previous images and/or representations and compare them with the images and/or representations that are used for later object segmentations.

In similar implementations, the computing device may compare regions of the images to templates representative of regions corresponding to objects that are known to include surface features of the type. For example, when a given box hypothesis (or a warped, canonical representation thereof) includes an identified "horizontal portion" that is suspected to be a piece of tape extending from a left edge of the box hypothesis to a right edge of the box hypothesis, the given box hypothesis may be compared to a template of a box that includes a horizontal piece of tape of a given width extending from a left edge of the box template to a right edge of the box template. If features of the given box hypothesis substantially match features of the box template (e.g., if the horizontal portion is in substantially the same location of the box as the tape in the box template), the given box hypothesis may be determined to correspond to a distinct box in the physical environment. In particular, one or more algorithms may be used to compare the given box hypothesis with the box template and determine similarity between the two, such as a normalized cross-correlation, a mean squared error, and a sum of absolute differences, among other possibilities. Other examples are possible as well.

At block 308, a virtual representation is determined based at least in part on the regions associated to the corresponding objects. The virtual representation of the physical environment may include at least one distinct object segmented from a remaining portion of the physical environment so as to virtually distinguish a boundary of the at least one distinct object from boundaries of objects present in the remaining portion of the physical environment. The virtual representation may be a segmented version of any one or more of the virtual representations of the physical environment described above, or may be a newly-determined 2D, 3D, or other n-dimensional virtual representation of at least a portion of the objects in the environment.

In some implementations, a computing device may select a distinct object based on the segmented virtual representation and instruct a robotic manipulator to move or otherwise interact with the selected object.

Detection of surface feature such as tape may facilitate improved box hypothesis determination and object segmentation. One or more of the operations described at blocks 300-308 may be implemented before the global reasoning module operations and after removal of box hypotheses, as described above.

When box hypotheses are determined, respective confidence scores may be associated to respective regions associated with the box hypotheses. In some implementations, higher confidence scores may be associated to box hypotheses that include identified surface features of the determined type than to box hypotheses that do not include identified surface features of the type. As such, the images may be segmented based on these confidence scores. For instance, when object segmentation is performed based on identified surface features, each box hypothesis may be assigned a "surface feature value" that is based on a quality of surface feature that was detected, if any. As an example, the surface feature value for each box hypothesis may be initialized with a value of 1 and increased if a surface feature is identified in a region of the image associated with the box hypothesis. The surface feature value may either be increased by a constant value or by a confidence value associated with the likelihood that a surface feature has been identified as part of the box hypothesis. The resulting surface feature value may be used during global optimization. For example, the final confidence score that is assigned to a particular box hypothesis and used during global optimization and determining the segmented virtual representation (at block 308) may equal a product of box area, box probability (e.g., a probability of a box hypothesis being a real box), and the surface feature value.

In an example scenario where surface features and associated confidence scores of boxes are applied, two boxes may be stacked on top of each other in an environment, but three box hypotheses may be detected (e.g., two box hypotheses for the two distinct boxes, and one larger box hypothesis that includes the area of the two smaller box hypotheses). However, if respective surface features such as barcodes are detected on each of the two smaller box hypotheses and a computing device expects to only identify one barcode per box hypothesis, a confidence score of each of the two smaller box hypotheses may be increased by a given amount such that they have a higher confidence score than the larger box hypothesis.

Various processes may be implemented to identify surface features and segment images based on those features. Some of these processes may modify processes described above with respect to determination of volumetric representations of physical environments, orthographic projections, and box hypothesis determination.

In some implementations, the computing device may search for regions of at least one image, 3D volume, etc. that indicate a threshold high level of light reflected off of at least one object of the one or more objects in order to identify tape or other reflective features. Those regions may then be associated to corresponding objects. Such an implementation may involve, for instance, computing, for each voxel of the 3D volumetric representation of the environment, a running mean of intensity values associated to the respective voxel. The intensity values may represent light reflected off portions of one or more surfaces of objects, and thus those portions of the volumetric representation (as well as the input images from which the volumetric representation is generated) may appear different than other portions (e.g., higher intensity). A running standard deviation of each voxel's intensity value may also be determined with respect to the mean. A voxel with a standard deviation that exceeds a predetermined threshold may indicate that there is a high probability of reflection of light in the image(s) and volumetric representation at the location of that voxel. Thus, larger regions of the image(s) and the volumetric representation that comprise many voxels with high standard deviations of intensity values may correspond to tape or other reflective surface features. The computing device may then associate such regions to corresponding objects in the physical environment to be segmented. For instance, a confidence score of a box hypothesis may be decreased based on whether the box hypothesis is associated with regions with high standard deviations of intensity values (e.g., when a border of a box hypothesis is aligned with regions with high standard deviations that indicate a reflective region such as tape). This decrease in confidence score may only occur, in some implementations, when at least a portion of a border of the box hypothesis is within a threshold distance of the regions with high standard deviations of intensity values (e.g., not when the interior of the box hypothesis covers the reflective regions).

It should be understood that while tape may most commonly be predicted to be contained on surfaces of an object at particular locations (e.g., along a middle of a box, where box flaps meet), this process may allow tape or other reflective surfaces to be found at less common locations of an object. However, reflective surface features of objects at locations that are less common may not increase a confidence score of an associated box hypothesis as much as surface features that are found at more common locations.

In some implementations, a box hypothesis computed from the orthographic image(s) may be warped to be an image that is a canonical representation of the box hypothesis (e.g., a rectangle representing a face of a box). In particular, the box hypothesis may be warped to a plane that is fronto-parallel to a camera that captured the original images. For instance, a box face in the orthographic image may not be perpendicular to human view, and thus a view of that box face may resemble a parallelogram rather than a rectangle. Therefore, a "canonical representation" of the box hypothesis may result from a transformation of the box hypothesis that rotates the box side such that a rectangle is viewable. The rectangle view, or "warped image," may be easier to analyze and identify surface features from. The warped image may have a width and height that is consistent with 3D dimensions of the box hypothesis. Further, the warped image may be filtered using a median filter or other digital filtering technique in order to remove salt and pepper noise and sparse reflections.

Given the warped image, various methods may be performed to identify surface features of the type. In one method, a set of line segments may be extracted from the warped image. One or more line segments of the extracted set that may likely be one larger line segment (e.g., angle between is very small, difference between line segment endpoints is very small) may be merged, and line segments that are small (e.g., a certain height, width, or the smaller of the two dimensions of the line segment is threshold low) may be removed from the set. Remaining line segments of the set may be compared to determine whether two given line segments (i) are substantially parallel, (ii) include a centerline of a box (e.g., a box flap), and (iii) are separated by a predetermined distance (e.g., a distance that was determined before by learning about different tape widths). If two such line segments are identified, the two line segments may be determined to represent edges of tape in a region of the warped image. This method may be performed with sets of substantially horizontal line segments as well as with sets of substantially vertical line segments. In some scenarios, the method may involve determining whether a color/intensity or other characteristic of the area between the two line segments differs from characteristics of other portions of the warped image (e.g., the rest of the box).

In another method, the warped image and a template are compared. For instance, normalized cross-correlation may be used, where the warped image and the template are compared to determine whether the template substantially matches the warped image. An example template may comprise two homogenous areas, one associated with tape and one associated with the entire box tape, where the tape area may be located either vertically or horizontally by the centerline to cover a box flap. In some scenarios, the tape portion of a template may be determined based on extracted parallel line segments that may represent tape, as noted above. When a normalized cross-correlation value is computed and then determined to exceed a predetermined threshold, an increased confidence score may be determined for the warped image and associated box hypothesis. Thus, the warped image and associated box hypothesis may be determined to be associated to a distinct box containing tape and thus segmented from the image.

In some scenarios, actual tape on a box may be linearly or angularly offset from where tape might normally be predicted to be (e.g., the centerline of the box). In such scenarios, rigid template matching may not account for such an offset. Thus, in a variation of the previous method, after determining a template, one or more image registration algorithms may be applied to register the template to the warped image. For instance, algorithms such as the Lucas-Kanade method or Efficient Second Order Minimization (ESM) may be applied. Thus, the warped image may be associated to a distinct object based on the best similarity score between the template and the warped image, where the similarity score is determined using algorithms such as normalized cross-correlation, mean squared error, sum of absolute differences, or the like. With some algorithms, the "best" similarity score may be the lowest similarity score, while with other algorithms, the "best" similarity score may be the highest similarity score.

In still another method, a cascade classifier, such as the Viola-Jones object detection framework, may be used to train a tape classifier to distinguish between segmentations that are true positives and segmentations that are false positives/true negatives.

In other implementations, one or more of these methods may be carried out for other surface features such as barcodes and stickers. For instance, the computing device may look for parallel line segments near corners of boxes rather than near a centerline of a box. Other examples are possible as well.

In some implementations, the box hypotheses that remain after removing identical box hypotheses can be sorted by area, where respective areas are based on a number of pixels included in each box hypothesis. Using one or more of the methods described above, each box hypothesis may then be checked to determine whether tape or other surface features are present in that box hypothesis. When a given box hypothesis is determined to have a surface feature of the type, box hypotheses that are threshold smaller in area than the given box hypothesis may then be compared to the given box hypothesis. For example, for each box hypothesis that is threshold smaller than the given box hypothesis, an area where the smaller box hypothesis overlaps the given box hypothesis may be measured. Then, when (i) the area of overlap approximately matches (or is within a predetermined threshold from) the area of the small box hypothesis and (ii) the small box hypothesis is threshold smaller than the given box hypothesis, a confidence score of the small box hypothesis may be decreased by either a constant value or a confidence value associated with the likelihood that a surface feature has been identified as part of the box hypothesis.

Figure 4A:
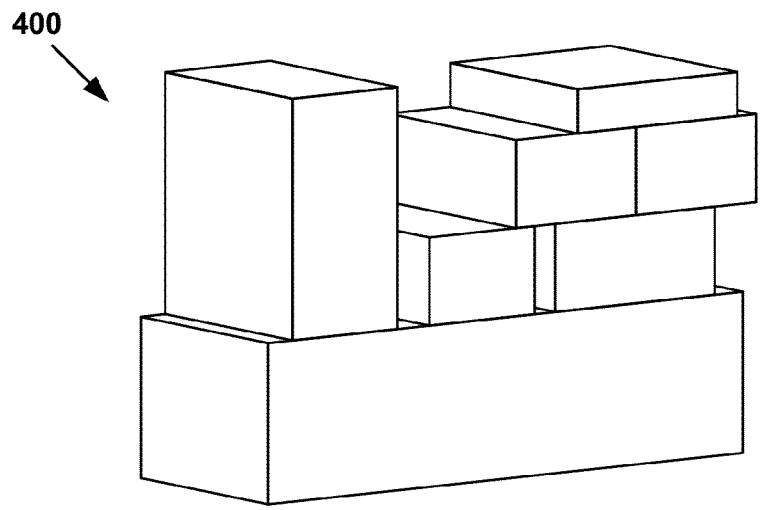
FIGS. 4A and 4B illustrate example systems in which operations of the example method can be performed, in accordance with at least some implementations described herein.
Figure 4B:
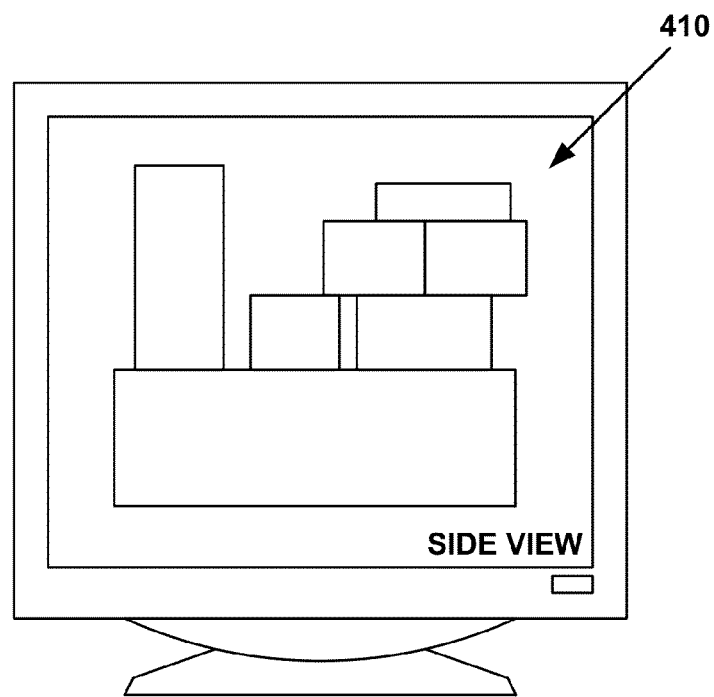

FIGS. 4A and 4B illustrate example systems configured to perform operations of the example method, in accordance with at least some implementations described herein. FIG. 4A illustrates an example stack of boxes 400. Accordingly, FIG. 4B illustrates an example side view facade of the boxes 410 on a computer screen. The facade of boxes 410 may be determined based on an orthographic projection of a volumetric representation of the stack of boxes 400. As shown, the volumetric representation may be projected onto a reference plane orthogonal to the ground on which the boxes 400 are stacked, where the reference plane is also orthogonal to a side view sightline of one or more sensors of a robotic arm (not shown).

Figure 5A:
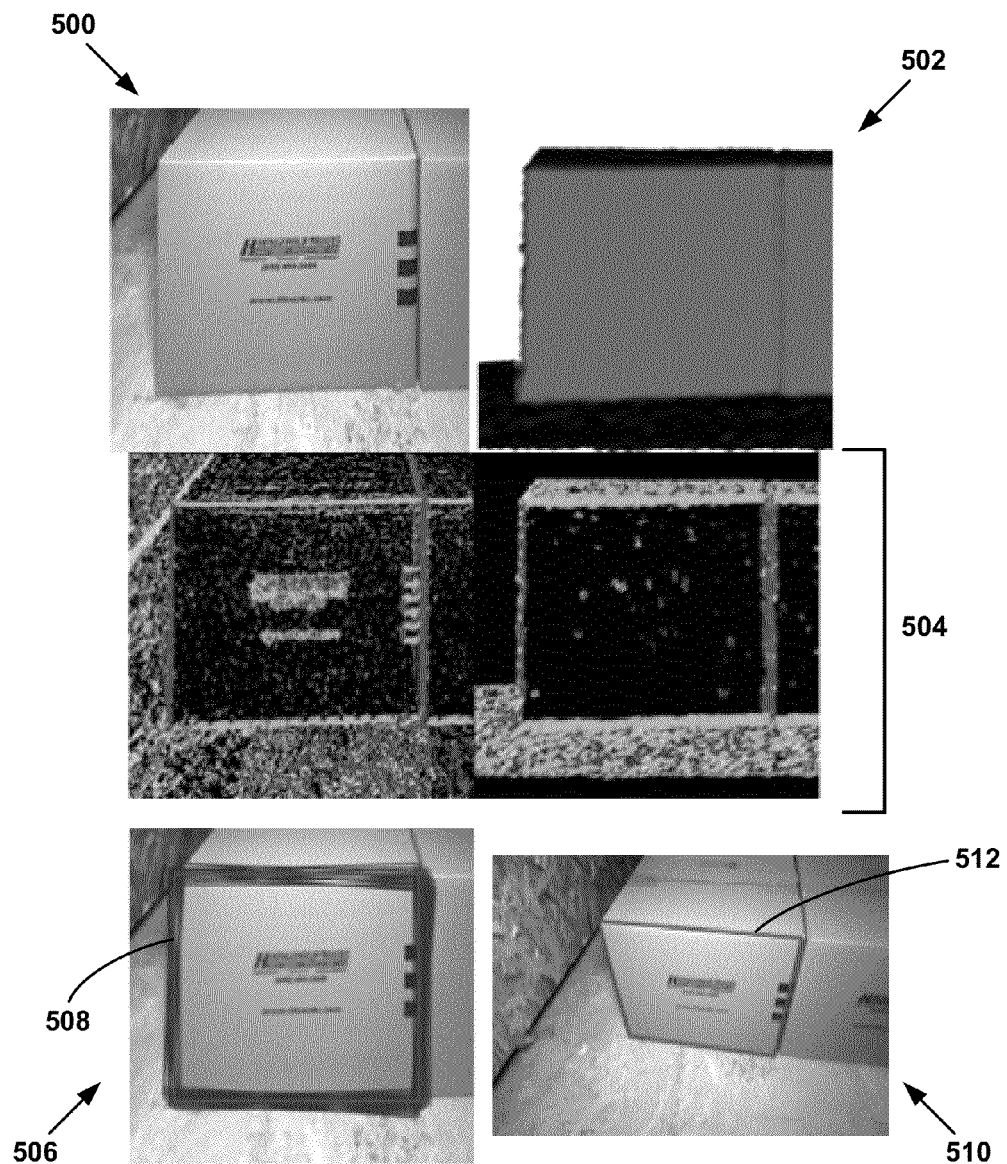
FIGS. 5A and 5B illustrate aspects of the example method, in accordance with at least some implementations described herein.
Figure 5B:
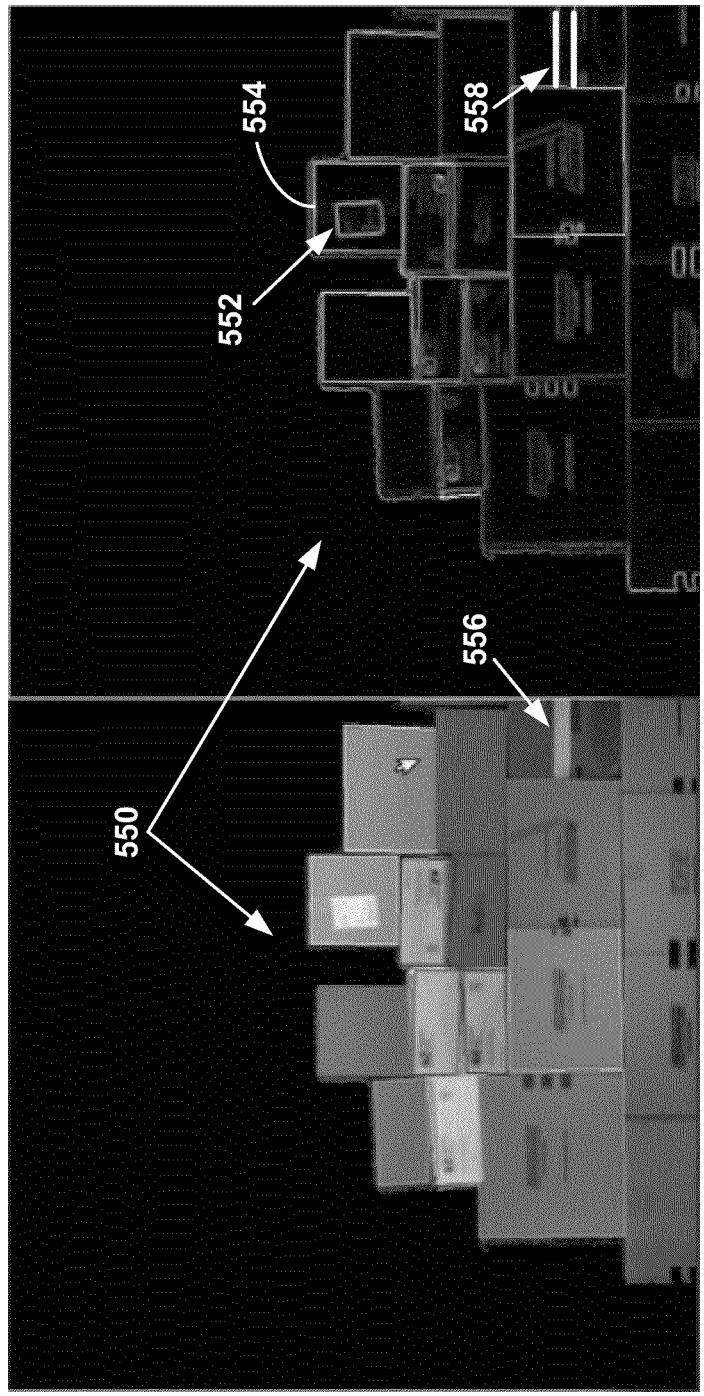

FIGS. 5A and 5B illustrate aspects of the example method, in accordance with at least some implementations described herein. In particular, FIG. 5A illustrates example orthographic projections based on a small, high resolution TSDF. The top two images are the orthographic projection of the visual 500 and depth 502 maps (i.e., a visual image, and a normal image derived from the depth map (where the normal image, although not shown in FIG. 5A, may typically be a colored image)). The middle two images 504 show features extracted from the images. Here, straight line segments are the main feature that is used here to detect parallelogram structures (e.g., box hypotheses) that may represent a box face, although other features may be used in addition to or alternatively to straight line segments in this example or other examples not described herein. The bottom left image 506 shows a set of templates that delineate the parallelogram that is extracted from the line segments; the best-fit template 508 is highlighted. As shown in the bottom right image 510, the best-fit template 508 is adjusted 512 and projected back to an original view of the box, identifying a face of the box.

In some implementations, large regions may be scanned at high resolution to detect boxes or other physical objects. FIG. 5B illustrates a set of box hypotheses 550 that may be detected. In this example, surface features of the boxes may be used to remove box hypotheses that do not fit into an overall configuration of boxes. For instance, although a label 552 that is coupled to a surface of one of the topmost boxes is detected as a parallelogramatic structure, that label may not be identified as a box because there is a stronger-confidence box hypothesis for the parallelogramatic structure 554 that encloses the label. However, the label may be identified as a surface feature of the type which can increase the confidence score of the larger box hypothesis 554 because the system expects that labels such as label 552 will be contained to only a single surface/face of a box. Further, a surface feature such as tape 556 may be identified by extracting line segments 558, as discussed above.

Figure 6A:
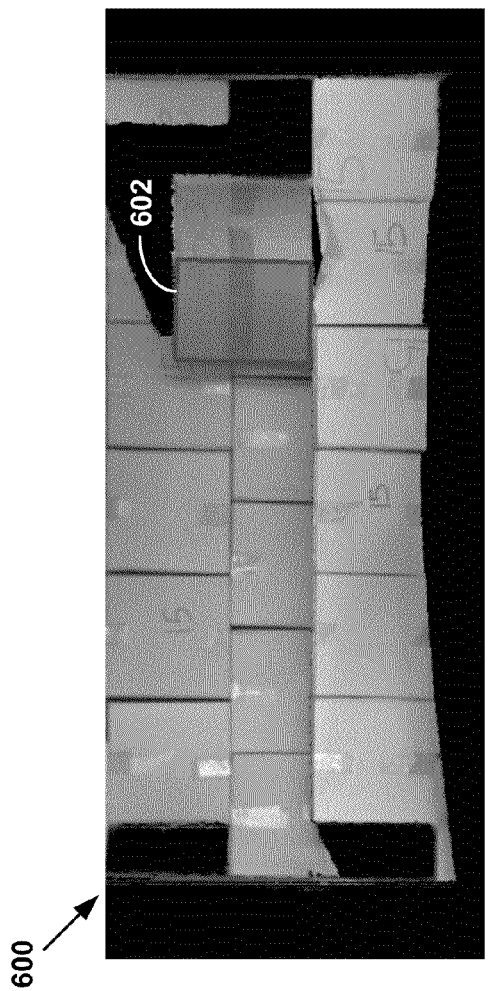
FIGS. 6A and 6B illustrate example operations of the example method being performed, in accordance with at least some implementations described herein.
Figure 6A:
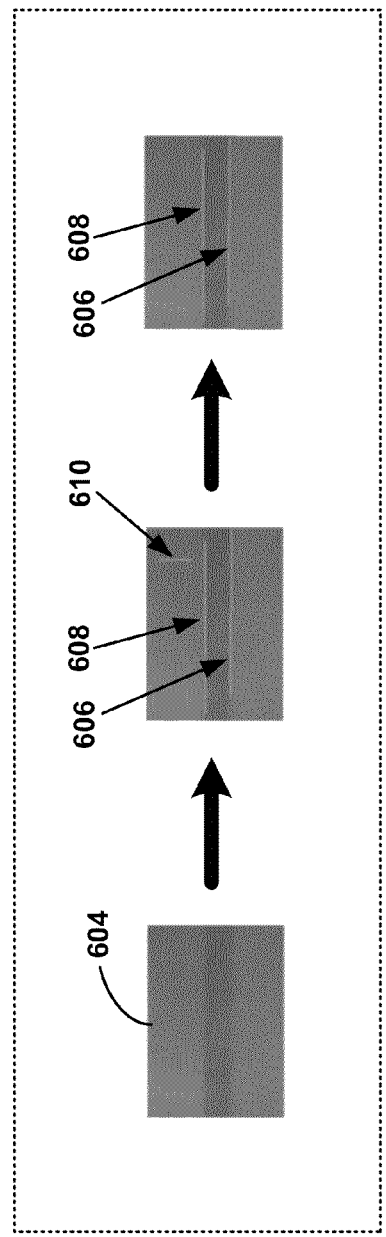
Figure 6B:
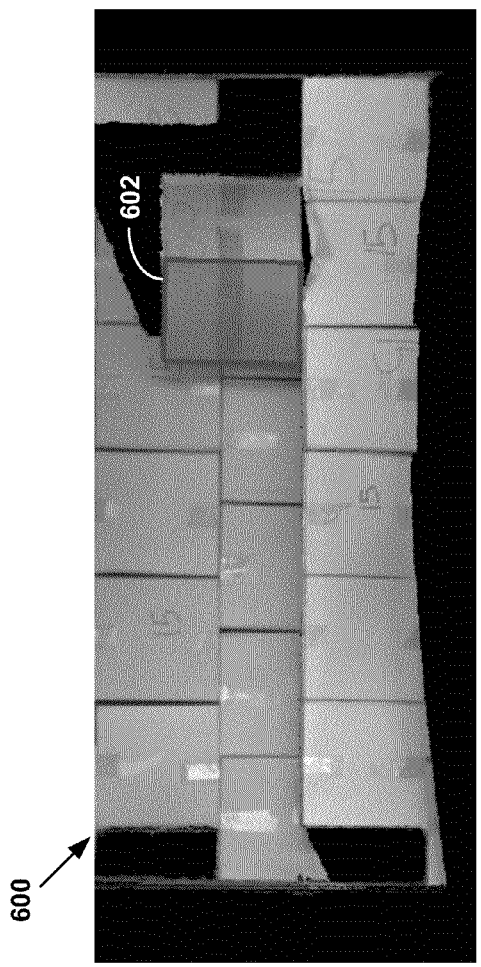
Figure 6B:
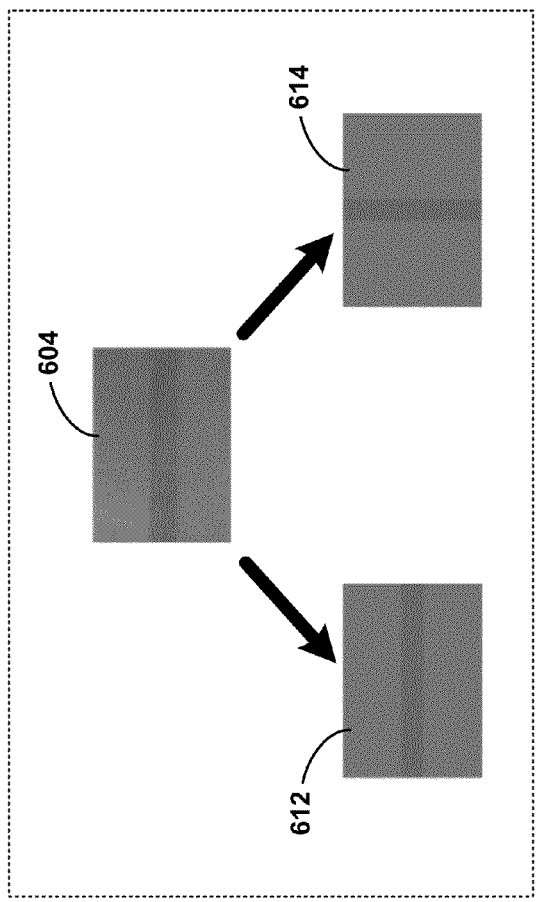

FIGS. 6A and 6B illustrate example operations of the example method being performed, in accordance with at least some implementations described herein. FIG. 6A illustrates an orthographic image 600 projected from a volumetric reconstruction of a stack of boxes. A box hypothesis 602 region is shown in the image 600, where the box hypothesis is a parallelogramatic outline of a single box face of a box that is turned. The box face also contains tape horizontally across the middle of the box. Because the box hypothesis 602 is not fronto-parallel to the camera, a canonical representation, or warped image 604, of the box hypothesis is determined. As discussed above, the warped image 604 may have a width and height that is consistent with 3D dimensions of the box hypothesis 602, and may be filtered using a median filter to remove salt and pepper noise and sparse reflections. A set of line segments 606-610 may then be extracted from the warped image 604. A small line segment 610 may be removed from the set of line segments. A pair of longer line segments, 606 and 608, are then checked to determine whether they (i) are substantially parallel, (ii) include a centerline of a box, and (iii) are separated by a predetermined distance representative of an expected tape width. Because line segments 606 and 608 fit such criteria, they may be determined to represent edges of tape in the warped image 604, and thus a confidence score associated with the box hypothesis may be increased.

FIG. 6B illustrates other operations that may be performed based on the warped image 604 to determine whether the box hypothesis 602 corresponds to a distinct box in the environment shown in the image 600. In FIG. 6B, the warped image 604 may be compared to a predetermined horizontal tape template 612 and vertical tape template 614. Upon determining that the warped image 604 has a high similarity score based on a comparison with the horizontal tape template 612, a confidence score associated with the box hypothesis may be increased because the box hypothesis is likely to correspond to a distinct box in the environment shown in the image 600.

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are operational entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A method performed by a computing device having one or more processors and memory, the method comprising:
    receiving one or more images of a physical environment, wherein the one or more images include one or more objects;
    based on the one or more images, determining one or more regions of the one or more images, the one or more regions representing estimated boundaries of distinct objects in the physical environment;
    determining a type of surface feature predicted to be contained on a portion of one or more surfaces of a single object;
    identifying, by the one or more processors, surface features of the type within the one or more regions;
    determining, for each region of the determined one or more regions, a respective confidence score based on whether an identified surface feature is contained in the region, wherein the respective confidence score is indicative of a probability that the region corresponds to a distinct object in the physical environment; and
    based on the determined confidence scores, determining, by the one or more processors, a virtual representation of the physical environment including at least one distinct object segmented from a remaining portion of the physical environment so as to virtually distinguish a boundary of the at least one distinct object from boundaries of objects present in the remaining portion of the physical environment.

2. The method of claim 1, wherein the type of surface feature includes one or more of: a piece of tape adhered to an object, a barcode contained on an object, a sticker coupled to an object, text printed onto an object, and an image printed onto an object.

3. The method of claim 1, further comprising:
    based on the determined virtual representation, selecting a particular object in the physical environment that corresponds to a particular distinct object segmented from the remaining portion of the physical environment; and
    providing an instruction to a robotic manipulator to move the selected object.

4. The method of claim 1, further comprising:
    based on the received one or more images, determining a three-dimensional (3D) virtual representation of the physical environment, wherein respective images of the one or more images correspond to respective different views of the one or more objects;
    determining an average of intensity values associated with voxels of the 3D virtual representation, wherein the intensity values are representative of light reflected off portions of one or more surfaces of objects that correspond to voxels of the 3D virtual representation;
    determining, for respective voxels of the 3D virtual representation, a standard deviation of the intensity value associated with the respective voxel with respect to the average;
    making a determination, for the respective voxels of the 3D virtual representation, whether the determined standard deviation of the respective voxel is less than a predetermined threshold; and
    decreasing respective confidence scores of the determined one or more regions that comprise a plurality of voxels that (i) have standard deviations that are less than the predetermined threshold and (ii) are located within a threshold distance of at least a portion of a border of the respective region,
    wherein determining the virtual representation of the physical environment including at least one distinct object segmented from a remaining portion of the physical environment so as to virtually distinguish a boundary of the at least one distinct object from boundaries of objects present in the remaining portion of the physical environment is further based on the decreased respective confidence scores.

5. The method of claim 1, further comprising:
    determining a three-dimensional (3D) virtual representation of the physical environment based on the received one or more images, wherein respective images of the one or more images correspond to respective different views of the one or more objects; and
    determining one or more orthographic projections of the 3D virtual representation of the physical environment, and
    wherein determining the one or more regions of the one or more images comprises determining the one or more regions to be one or more regions of the one or more orthographic projections.

6. The method of claim 1, wherein identifying surface features of the type within the one or more regions comprises identifying surface features of the type within regions of the one or more regions that correspond to predetermined locations of previously-identified surface features of the type contained on other objects.

7. The method of claim 1, wherein the determined one or more regions include multiple regions, wherein at least one region of the multiple regions overlaps at least one other region of the multiple regions, the method further comprising:
    determining respective areas of the determined one or more regions, wherein the respective areas are based on a number of pixels included in respective regions of the determined one or more regions;
    making a comparison between areas of at least one of the determined one or more regions which include identified surface features of the type and areas of at least one determined one or more regions that are threshold smaller than the areas of the at least one determined one or more regions which include identified surface features of the type; and
    based on an output of the comparison, adjusting the respective confidence scores of the at least one of the determined one or more regions that have the threshold smaller areas.

8. The method of claim 7, wherein making the comparison comprises (i) measuring an area of overlap representative of a location where the areas of the at least one determined one or more regions that have threshold smaller areas overlap the areas of at least one of the determined one or more regions which include identified surface features of the type, and (ii) determining that the area of overlap approximately matches at least one of the threshold smaller areas, and
    wherein adjusting the respective confidence scores of the at least one of the determined one or more regions that have the threshold smaller areas based on the output of the comparison comprises decreasing the respective confidence scores of the determined one or more regions that have the threshold smaller areas that approximately match the area of overlap.

9. The method of claim 8, wherein decreasing the respective confidence scores of the determined one or more regions that have the threshold smaller areas that approximately match the area of overlap comprises decreasing the respective confidence scores by a particular value, wherein the particular value is either a predetermined constant or a value based on whether the determined one or more regions that have the threshold smaller areas include identified surface features of the type.

10. The method of claim 1, wherein determining, for each region of the determined one or more regions, the respective confidence score based on whether an identified surface feature is contained in the region comprises determining a higher confidence score for regions of the one or more regions that contain the identified surface feature.

11. A non-transitory computer readable medium having stored thereon instructions that, upon execution by a computing device, cause the computing device to perform operations comprising:
   receiving one or more images of a physical environment, wherein the one or more images include one or more objects;
   based on the one or more images, determining one or more regions of the one or more images, the one or more regions representing estimated boundaries of distinct objects in the physical environment;
   determining a type of surface feature predicted to be contained on a portion of one or more surfaces of a single object;
   identifying surface features of the type within the one or more regions;
   determining, for each region of the determined one or more regions, a respective confidence score based on whether an identified surface feature is contained in the region, wherein the respective confidence score is indicative of a probability that the region corresponds to a distinct object in the physical environment; and
   based on the determined confidence scores, determining a virtual representation of the physical environment including at least one distinct object segmented from a remaining portion of the physical environment so as to virtually distinguish a boundary of the at least one distinct object from boundaries of objects present in the remaining portion of the physical environment.

12. The non-transitory computer readable medium of claim 11, wherein the portion of the one or more surfaces of the single object includes a portion of at least one edge of the single object beyond a threshold distance from corners of the single object.

13. The non-transitory computer readable medium of claim 11, wherein the portion of the one or more surfaces of the single object includes a portion beyond a threshold distance from edges and corners of the single object.

14. The non-transitory computer readable medium of claim 11, wherein the one or more images include one or more of: at least one depth map image of the one or more objects, at least one color image of the one or more objects, at least one intensity image of the one or more objects, and a gradient image of the one or more objects.

15. The non-transitory computer readable medium of claim 11, wherein identifying surface features of the type within the one or more regions comprises identifying surface features of the type within the one or more regions based on templates representative of regions corresponding to objects that are known to include surface features of the type.

16. The non-transitory computer readable medium of claim 11, wherein determining the respective confidence scores comprises (i) increasing, for each region of the one or more regions in which an identified surface feature is contained, the respective confidence score of the region and (ii) decreasing, for each region of the one or more regions having an area that is threshold smaller than an area of at least one of the regions in which an identified surface feature is contained, the respective confidence score of the region, and
   wherein determining the virtual representation based on the determined confidence scores comprises determining the virtual representation based on the increased and decreased confidence scores.

17. The non-transitory computer readable medium of claim 11, wherein the identifying comprises determining that at least one region of the one or more regions contains, within a respective boundary of the respective region, a sub-region that indicates a threshold high level of light reflected off at least one object of the one or more objects.

18. A system comprising:
   at least one processor; and
   data storage comprising instructions executable by the at least one processor to cause the system to perform operations comprising:
      receiving one or more images of a physical environment, wherein the one or more images include one or more objects,
      based on the one or more images, determining one or more regions of the one or more images, the one or more regions representing estimated boundaries of distinct objects in the physical environment;
      determining a type of surface feature predicted to be contained on a portion of one or more surfaces of a single object, the portion being different from a full length of a boundary of the one or more surfaces of the single object,
      identifying surface features of the type within the one or more regions;
      determining, for each region of the determined one or more regions, a respective confidence score based on whether an identified surface feature is contained in the region, wherein the respective confidence score is indicative of a probability that the region corresponds to a distinct object in the physical environment; and
      based on the determined confidence scores, determining a virtual representation of the physical environment including at least one distinct object segmented from a remaining portion of the physical environment so as to virtually distinguish a boundary of the at least one distinct object from boundaries of objects present in the remaining portion of the physical environment.

19. The system of claim 18, wherein the portion is different from a full length of a boundary of the one or more surfaces of the single object.

20. The system of claim 18, wherein the type of surface feature includes one or more of: a piece of tape adhered to an object, a barcode contained on an object, a sticker coupled to an object, text printed onto an object, and an image printed onto an object.

* * * * *